(12) United States Patent
Kato

(10) Patent No.: US 8,086,087 B2
(45) Date of Patent: Dec. 27, 2011

(54) INFORMATION PROCESSING DEVICE AND METHOD, PROGRAM, AND RECORDING MEDIUM

(75) Inventor: Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1443 days.

(21) Appl. No.: 10/520,488

(22) PCT Filed: Apr. 22, 2004

(86) PCT No.: PCT/JP2004/005782
§ 371 (c)(1),
(2), (4) Date: Jan. 7, 2005

(87) PCT Pub. No.: WO2004/100545
PCT Pub. Date: Nov. 18, 2004

(65) Prior Publication Data
US 2005/0249202 A1 Nov. 10, 2005

(30) Foreign Application Priority Data
May 8, 2003 (JP) .................................. 2003-130661

(51) Int. Cl.
H04N 5/932 (2006.01)
H04N 5/935 (2006.01)
H04N 5/94 (2006.01)
H04N 9/88 (2006.01)
H04N 5/93 (2006.01)

(52) U.S. Cl. ........ 386/201; 386/211; 386/214; 386/217; 386/220; 386/278; 386/290; 386/353

(58) Field of Classification Search ............. 386/52, 386/95, 111
See application file for complete search history.

(56) References Cited

U.S. PATENT DOCUMENTS

| 6,181,872 B1* | 1/2001 | Yamane et al. ............... 386/112 |
| 6,507,592 B1* | 1/2003 | Hurvig et al. ................. 370/503 |
| 6,584,273 B1* | 6/2003 | Ashley et al. .................. 386/52 |
| 6,873,629 B2* | 3/2005 | Morris ........................ 370/535 |
| 6,952,521 B2* | 10/2005 | Kelly et al. .................... 386/290 |
| 6,996,327 B1* | 2/2006 | Park et al. ..................... 386/241 |
| 7,382,796 B2* | 6/2008 | Haberman et al. ............ 370/429 |
| 7,386,223 B2* | 6/2008 | Yagi et al. .................... 386/329 |
| 2003/0038807 A1* | 2/2003 | Demos et al. ................. 345/473 |

FOREIGN PATENT DOCUMENTS

| JP | 2000-175152 | 6/2000 |
| JP | 2000-183957 | 6/2000 |
| JP | 2002-157859 | 5/2002 |
| JP | 2002-158971 | 5/2002 |
| JP | 2002-158972 | 5/2002 |
| JP | 2002-158974 | 5/2002 |

* cited by examiner

Primary Examiner — William Vaughn, Jr.
Assistant Examiner — Gelek W Topgyal
(74) Attorney, Agent, or Firm — Oblon, Spivak, McClelland, Maier & Neustadt, L.L.P.

(57) ABSTRACT

A player model (1) includes an output section (10) that reads out a source packet having a transport packet and arrival time stamp from TS1 and TS2 connected seamlessly to each other and outputs the transport packet according to the arrival time stamp, and a decoder (20) that decodes the transport packet. The output section (10) inputs the transport packet according to the arrival time stamp of the source packet to the decoder (20). The decoder (20) includes an audio buffer TBn having a capacity capable of buffering the audio data corresponding to the time required for inputting I picture, which is the first picture of TS2, to a video buffer TB1.

20 Claims, 15 Drawing Sheets

| Syntax | No. of bits | Mnemonic |
|---|---|---|
| ClipInfo() { | | |
|   length | 32 | uimsbf |
|   reserved for future use | 16 | bslbf |
|   Clip stream type | 8 | bslbf |
|   application type | 8 | bslbf |
|   reserved for future use | 31 | bslbf |
|   is_ATC_delta | 1 | bslbf |
|   TS recording rate | 32 | uimsbf |
|   number of source packets | 32 | uimsbf |
|   reserved for future use | 1024 | bslbf |
|   TS type info block() | | |
|   if (is_ATC_delta==1b){ | | |
|     reserved for future use | 8 | bslbf |
|     number of ATC delta entries | 8 | uimsbf |
|     for (i=0; i<number of ATC delta entries; i++){ | | |
|       ATC delta [i] | 32 | uimsbf |
|       following Clip Information file name[i] | 8*5 | bslbf |
|       Clip codec identifier | 8*4 | bslbf |
|       reserved for future use | 8 | bslbf |
|     } | | |
|   } | | |
| } | | |

FIG. 12

INFORMATION PROCESSING DEVICE AND METHOD, PROGRAM, AND RECORDING MEDIUM

TECHNICAL FIELD

The present invention relates to an information processing device for editing a multiplexed stream consisting of video and audio streams with video frame accuracy and seamlessly reproducing the edit point, its method, a program, and recording medium and, an information processing device that generates a multiplexed stream in the optimum form for seamless reproduction and a recording medium that stores the multiplexed stream data.

The present application claims priority from Japanese Patent Application No. 2003-130661 filed on May 8, 2003, the content of which is hereby incorporated by reference into this application.

BACKGROUND ART

A method for editing a multiplexed stream of video and audio streams with video frame accuracy and seamlessly reproducing edit points is described in Jpn. Pat. Appln. Laid-Open Publication No. 2000-175152, Jpn. Pat. Appln. Laid-Open Publication No. 2001-544118, and Jpn. Pat. Appln. Laid-Open Publication No. 2002-158974.

FIG. 1 is a block diagram showing a conventional DVR-STD model (DVR MPEG2 transport stream player model) (hereinafter, referred to as "player") 101. The DVR-STD is a conceptual model for modeling decode processing in generating and examining an AV stream that is referred to by seamlessly connected two PlayItems.

As shown in FIG. 1, in the player 101, a TS (Transport Stream) file read out from a readout section (DVR drive) 111 at a bit rate $R_{UD}$ is buffered in a read buffer 112. From the read buffer 112, a source packet is read out to a source depacketizer 113 at a maximum bit rate $R_{MAX}$.

A pulse oscillator (27 MHz X-tal) 114 generates a 27 MHz pulse. An arrival time clock counter 115 is a binary counter that counts the 27 MHz frequency pulse and supplies the source depacketizer 113 with a count value Arrival_time_clock(i) of the arrival time clock counter at a time t(i).

One source packet has one transport packet and its arrival_time_stamp. When the arrival_time_stamp of the current source packet is equal to the value of LSB (Least Significant Bit: 30 bit) of the arrival_time_clock(i), a transport packet of the current source packet is output from the source depacketizer 113. TS_recording_rate is a bit rate of a transport stream (hereinafter referred to as "TS"). Notations of n, TBn, MBn, EBn, TBsys, Bsys, Rxn, Rbxn, Rxsys, Dn, Dsys, On, and Pn (k) shown in FIG. 1 are the same as those defined in T-STD transport stream system target decoder specified by ISO/IEC 13818-1) of SO/IEC 13818-1 (MPEG2 systems specification).

Decoding process in the above conventional player 101 will next be described. Firstly, the decoding process during reproduction of a single DVR MPEG2 TS will be described. During reproduction of a single DVR MPEG2 TS, the timing at which a transport packet is output from an output section 110 so as to be input to TB1, TBn or TBsys of the DVR-STD, which is a decoder 120, is determined by arrival_time_stamp of the source packet. Specification related to buffering operations of TB1, MB1, EB1, TBn, Bn, TBsys and TBsys is the same as in the case of the T-STD specified by ISO/IEC 13818-1. Specification related to decoding and presentation operations is also the same as in the case of the T-STD specified by ISO/IEC 13818-1.

Next, decoding process during reproduction of seamlessly connected PlayItems will be described. Here, reproduction of a previous stream TS1 and a current stream TS2 that are referred to by the seamlessly connected PlayItems will be described.

During the shift between a certain AV stream (TS1) and the next AV stream (TS2) seamlessly connected to the AV stream (TS1), the time axis of TS2 arrival time base is not the same as that of TS1 arrival time base. Further, the time axis of TS2 system time base is not the same as that of TS1 system time base. The presentation of video images needs to be continued seamlessly. An overlap may exist in the presentation time of audio presentation unit.

Next, an input timing of the transport packet read out from the source depacketizer to the DVR-STD will be described.

(1) Before time T1 at which the input of the last video packet of TS1 to TB1 of the DVR-STD has been completed Before time T1, input timing to buffer TB1, TBn or TBsys of the DVR-STD is determined by arrival_time_stamp of the source packet of TS1.

(2) From time T1 to time T2 at which the input of the last byte of remaining packets of TS1 has been completed Remaining packets of TS1 must be input to the buffer TBn or TBsys of the DVR-STD at a bit rate (maximum bit rate of TS1) of TS_recording_rate (TS1). TS_recording_rate(TS1) is a value of TS_recording_rate defined by ClipInfo ( ) corresponding to Clip 1. The time at which the last byte of TS1 is input to the buffer is time T2. Therefore, from time T1 to time T2, arrival_time_stamp of the source packet is ignored.

Assuming that $N_1$ is the number of bytes of the transport packet of TS1 that follows the last video packet of TS1, the time between T1 and T2 (time $T_{2-1}$=T2−T1) is the time required to complete the input of $N_1$ byte at a bit rate of TS_recording_rate(TS1), and is represented by the following equation (1).

$$T_{2-1}=T2-T1=N_1/TS\_recording\_rate(TS1) \qquad (1)$$

From time T1 to time T2, values of Rxn and Rxsys shown in FIG. 1 are changed to the value of TS_recording_rate (TS1). Except for the above rule, buffering operation is the same as that of the T-STD.

Since values of Rxn and Rxsys shown in FIG. 1 are changed to the value of TS_recording_rate(TS1) between time T1 and T2, additional buffer amount (data amount corresponding to about 1 second) is required in addition to the buffer amount defined by the T-STD so that an audio decoder can process the input data between time T1 and T2.

(3) After Time T2

At time T2, the arrival time clock counter 115 is reset to the value of arrival_time_stamp of the first source packet of TS2. The input timing to the buffer TB1, TBn or TBsys of the DVR-STD is determined by arrival_time_stamp of the source packet of TS2. Rxn and Rxsys are changed to the value defined by T-STD.

Next, video presentation timing will be described. A video presentation unit must be presented seamlessly through its connection point.

Here, it is assumed that

STC (System Time Clock) 1: time axis of TS1 system time base

STC2: time axis of TS2 system time base (correctly, STC2 starts from the time at which the first PCR (Program Clock Reference) of TS2 is input to the T-STD).

An offset value between STC1 and STC2 is determined as follows.

Assuming that $PTS1_{end}$: PTS on STC1 corresponding to the last video presentation unit TS1

$PTS2_{start}$: PTS on STC2 corresponding to the first video presentation unit of TS2

$T_{pp}$: presentation period of the last video presentation unit, offset value STC_delta between two system time bases is represented by the following equation (2).

$$STC\_delta = PTS1_{end} + T_{pp} - PTS2_{start} \quad (2)$$

Next, audio presentation timing will be described. An overlap of the presentation timing of the audio presentation. unit may exist at the connection point of TS1 and TS2, the overlap being from 0 to less than 2 audio frames. The player 101 must select one of the audio samples and re-synchronize the presentation of the audio presentation unit with the corrected time base after the connection point.

The processing for control of system time clock of the DVR-STD carried out by the player 101 when the time shifts from TS1 to TS2 seamlessly connected to TS1 will be described. At time T5 when the last audio presentation unit of TS1 is presented, the system time clocks may be overlapped between time T2 and T5. Between time T2 and T5, the DVR-STD switches the system time clock from the value (STC1) of the old time base to the value (STC2) of the new time base. The value of STC2 can be represented by the following equation (3).

$$STC2 = STC1 - STC\_delta \quad (3)$$

An encoding condition that TS1 and TS2 must meet when the time shifts from TS1 to TS2 seamlessly connected to TS1 will be described.

It is assumed that $STC1^1_{video\_end}$: value of STC on system time base STC1 when the last byte of the last video packet of TS1 reaches TB1 of the DVR-STD $STC2^2_{video\_start}$: value of STC on system time base STC2 when the first byte of the first video packet of TS2 reaches TB1 of the DVR-STD $STC2^1_{video\_end}$: value obtained by converting the value of $STC1^1_{video\_end}$ to the value on system time base STC2.

In this case, $STC2^1_{video\_end}$ is represented by the following equation (4).

$$STC2^1_{video\_end} = STC1^1_{video\_end} - STC\_delta \quad (4)$$

It is necessary to meet the following two conditions in order for the decoder 120 to conform to the DVR-STD.

(Condition 1)

The timing at which the first video packet of TS2 reaches TB1 must meet the following inequality (5).

$$STC2^2_{video\_start} > STC2^1_{video\_end} + T_{2-1} \quad (5)$$

The partial streams of Clip 1 and/or Clip 2 need to be re-encoded and/or re-multiplexed in order to meet the above inequality (5).

(Condition 2)

On the time axis of the system time base obtained by converting STC1 and STC2 to the same time axis as each other, inputs of the video packet from TS1 and subsequent inputs of the video packet from TS2 should not overflow and underflow the video buffer.

However, as described above, the conventional player 101 using the DVR-STD model can process input data between time T1 and T2. That is, since the remaining packets of TS1 are input to the buffer TBn or TBsys of the DVR-STD at a bit rate (maximum bit rate of TS1) of TS_recording_rate(TS1) between time T1 and T2, additional buffer having the capacity capable of buffering data amount corresponding to about 1 second is required in addition to the buffer amount defined by the T-STD.

This buffer capacity is based on the following factor. That is, among MPEG2 TSes, the audio data reproduced in synchronization with the video data corresponding to a certain byte position can exist apart from the multiplexed phase difference within a predetermined region, and the maximum value of this multiplexed phase difference is equal to the data amount corresponding to 1 second. Therefore, the maximum value of N1 of the above equation (1) is equal to the audio data corresponding to up to 1 second. Between time T1 and T2, arrival_time_stamp of the source packet is ignored and the source packet corresponding to the data amount of N1 is input to the audio buffer at the maximum bit rate of TS. Therefore, additional buffer amount (data amount corresponding to about 1 second) is required in addition to the buffer amount defined by the T-STD.

The volume of this additional buffer can be calculated as follows. That is, in the case of the audio stream that has been encoded according to Dolby AC-3 at, e.g., 640 kbps, the audio data corresponding to 1 second is 80 kbytes (=640 kbits). As a result, the additional buffer of 80 kBytes is required.

In the case of the audio stream (24 bit sample, 96 KHz sampling frequency, 8 channels) that has been encoded according to Linear PCM method, the audio data corresponding to 1 second is about 18 Mbits (=24 bit sample×96,000 samples/sec×8 channels). As a result, the additional buffer of about 3 Mbytes is required. Thus, in the case where the above multichannel audio data is employed, the size of the additional buffer becomes extremely large.

DISCLOSURE OF THE INVENTION

The present invention has been proposed in view of the conventional situation, and an object thereof is to provide an information processing device including an audio buffer having an optimum capacity for realizing seamless decoding of two multiplexed streams in each of which an audio stream and video stream are multiplexed, its method, a program and a recording medium, and an information processing device that generates a multiplexed stream corresponding to the audio buffer capacity, its method, and recording medium that records the multiplexed stream.

To attain the above object, an information processing device according to the present invention that decodes a multiplexed stream which includes a data stream constituted by a plurality of source packets each having a transport packet and its arrival time stamp, and in which a second picture, which is the first picture of a second multiplexed stream, is connected to a first picture, which is the last picture of a first multiplexed stream so as to be reproduced seamlessly, comprises: an output means for outputting the source packets according to the arrival time stamp of the multiplexed stream; a video buffer for buffering video data included in the source packets; an audio buffer for buffering audio data included in the source packets; a video decoding means for decoding the video data buffered in the video buffer; and an audio decoding means for decoding the audio data buffered in the audio buffer, the audio buffer having a capacity capable of buffering the audio data corresponding to the time required for inputting the second picture to the video buffer.

In the present invention, the audio buffer has a capacity capable of buffering the audio data corresponding to the time required for inputting the second picture to the video buffer, and the source packet is input to the buffer according to arrival_time_stamp of the source packet in the multiplexed stream even between the time at which the input of the first picture to the video buffer is completed and the time at which the input of the last source packet of the first multiplexed stream is completed. This eliminates the additional buffer corresponding to 1 second that has been conventionally required for inputting the transport packet at the maximum bit rate of TS with arrival_time_stamp of the source packet ignored. Further, it is possible to input the picture to be decoded first in the second multiplexed stream to the video buffer by the decoding timing thereof after the last transport packet of the first multiplexed stream has been input.

Further, $Ebn\_max=(I\_max/Rv) \times Ra$ can be satisfied where EBn_max (bits) is a capacity required for the audio buffer; I_max (bits) is a bit amount of the second picture, Rv (bps) is an input bit rate to the video buffer, and Ra (bps) is a bit rate of audio data, assuming that I_max is a bit amount of, for example, I picture, that is the second picture, capacity of audio buffer can be set to up to $EBn\_max=(I\_max/Rv) \times Ra$.

It is preferable that the audio buffer has a capacity capable of buffering the audio data corresponding to 100 milliseconds. Since the data amount of I picture according to MPEG2 specification is 10% or less of the data amount transmitted in 1 second in general, it is possible to input I picture to the video buffer by the decode timing thereof by setting the capacity of the audio buffer to the size corresponding to 100 milliseconds to allow the audio buffer to move ahead the audio data by that amount. As a result, encoding restriction on video data is reduced. That is, by setting the capacity of the audio buffer to the above size, it is possible to form a multiplexed stream so that the input of the audio data is completed 100 milliseconds earlier than the reproduction timing thereof.

Further, assuming that STC_delta is a time difference between presentation end time of the first picture on the time axis of the first multiplexed stream and presentation start time of the second picture on the time axis of the second multiplexed stream, $STC2^1_{end}$ $(=STC1^1_{end}-STC\_delta)$ is a value obtained by converting $STC1^1_{end}$, which is the value on the time axis of the first multiplexed stream at which the last byte of the last source packet of the first multiplexed stream is output from the output means, into the value on the time axis of the second multiplexed stream using the time difference STC_delta, and $STC2^2_{start}$ is the value on the time axis of the second multiplexed stream at which the first byte of the first source packet of the second multiplexed stream is output from the output means, the multiplexed stream satisfies $STC2^2_{start} > STC2^1_{end}$, thereby conforming to the DVR-STD.

Further, it is preferable to configure the information processing device such that after a lapse of a predetermined time delta1 after the last source packet of the first multiplexed stream has been output from the output means, the first source packet of the second multiplexed stream is output from the output means. In this case, $STC2^2_{start} > STC2^1_{end}$ is satisfied. As a result, determination of the input timing of the first source packet of the second multiplexed stream becomes more flexible, which makes it easy to encode the second multiplexed stream.

Further, assuming that STC_delta is a time difference between presentation end time of the first picture on the time axis of the first multiplexed stream and presentation start time of the second picture on the time axis of the second multiplexed stream, it is possible to configure the information processing device such that after a lapse of a predetermined time ATC_delta after the output of the last source packet of the first multiplexed stream has been started, the first source packet of the second multiplexed stream is output from the output means, the predetermined time ATC_delta is so determined as to satisfy the time difference STC_delta, and the multiplexed stream is so formed as to satisfy the time difference STC_delta. As a result, determination of the input timing of the first source packet of the second multiplexed stream becomes more flexible, which makes it easy to encode the second multiplexed stream.

In this case, it is possible to manage the predetermined time ATC_delta as attachment information of the first multiplexed stream.

An information processing method according to the present invention that decodes a multiplexed stream which includes a data stream constituted by a plurality of source packets each having a transport packet and its arrival time stamp, and in which a second picture, which is the first picture of a second multiplexed stream, is connected to a first picture, which is the last picture of a first multiplexed stream so as to be reproduced seamlessly, comprises: a step of outputting the source packets according to the arrival time stamp of the multiplexed stream; a step of buffering video and audio data included in the source packets in video and audio buffers, respectively; and a step of decoding the video and audio data buffered in the video and audio buffers, wherein, in the buffering step, the audio data corresponding to the time required for inputting the second picture to the video buffer is buffered in the audio buffer before the second picture is buffered in the video buffer.

A program according to the present invention allows a computer to execute the aforementioned information processing. A recording medium according to the present invention is a computer-readable recording medium that records the program.

Another recording medium according to the present invention records a multiplexed stream which includes a data stream constituted by a plurality of source packets each having a transport packet and its arrival time stamp, wherein the multiplexed stream is formed such that a second picture, which is the first picture of a second multiplexed stream, is connected to a first picture, which is the last picture of a first multiplexed stream so as to be reproduced seamlessly, the first and second multiplexed stream can be input to a decoder based on their respective arrival time stamps, and the input of the audio data corresponding to the time required for inputting the second picture to the decoder can be completed by the time at which the input of the second picture to the decoder is started.

In the present invention, a multiplexed stream is formed such that the input of the audio data corresponding to the time required for inputting the second picture to the decoder is completed by the time at which the input of the second picture to the decoder is started. As a result, it is possible to input the picture decoded first in the second multiplexed stream to the video buffer by the decode timing thereof after the last transport packet of the first multiplexed stream is input by decoding the multiplexed stream, using the decoder including an audio buffer having a capacity capable of buffering the audio data corresponding to the time required for inputting the second picture to the video buffer.

Another information processing device according to the present invention that generates a multiplexed stream which includes a data stream constituted by a plurality of source packets each having a transport packet and its arrival time stamp, and which is read out and decoded by a decoder based on the arrival time stamp, comprises: a video encoding means for generating a first video encoding stream to end the presentation with a first picture and a second video encoding stream that starts the presentation with a second picture to be presented immediately after the first picture; and a multiplexing means for multiplexing the first video encoding stream and an audio encoding stream synchronized with the first video encoding stream to generate a first multiplexed stream, multiplexing the second video encoding stream and an audio encoding stream synchronized with the second video encoding stream to generate a second multiplexed stream, and generating a multiplexed stream in which a second picture, which is the first picture of a second multiplexed stream, is connected to a first picture, which is the last picture of a first multiplexed stream so as to be reproduced seamlessly, wherein the multiplexing means multiplexes such that the input of the audio data corresponding to the time required for inputting the second picture to the decoder can be completed by the time at which the input of the second picture to the decoder is started.

In the present invention, multiplexing are performed such that the input of the audio data corresponding to e.g., 100 milliseconds, which corresponds to the time required for inputting the second picture to the decoder, is completed by the time at which the input of the second picture to the decoder is started. As a result, in the decoder, audio data is moved ahead to the audio buffer to sufficiently assure the time to transmit the second picture, such as I picture, by the decode timing thereof, which makes it easy to encode the multiplexed stream.

Another information method according to the present invention that generates a multiplexed stream which includes a data stream constituted by a plurality of source packets each having a transport packet and its arrival time stamp, and which is read out and decoded by a decoder based on the arrival time stamp, comprises: a step of generating a first video encoding stream to end the presentation with a first picture and a second video encoding stream that starts the presentation with a second picture to be presented immediately after the first picture; and a step of multiplexing the first video encoding stream and an audio encoding stream synchronized with the first video encoding stream to generate a first multiplexed stream, maltiplexing the second video encoding stream and an audio encoding stream synchronized with the second video encoding stream to generate a second multiplexed stream, and generating a multiplexed stream in which a second picture, which is the first picture of a second multiplexed stream, is connected to a first picture, which is the last picture of a first multiplexed stream so as to be reproduced seamlessly, wherein multiplexing is performed such that the input of the audio data corresponding to the time required for inputting the second picture to the decoder can be completed by the time at which the input of the second picture to the decoder is started.

The above and other objects, advantages and features of the present invention will be more apparent from the following description taken in conjunction with the accompanying drawings.

BRIEF DESCRIPTION OF THE DRAWINGS

FIG. 12 shows a data format of attachment information ClipInfo ( ) for storing ATC_delta;

BEST MODE FOR CARRYING OUT THE INVENTION

An embodiment of the present invention will be described in detail below with reference to the accompanying drawings. This embodiment is obtained by applying the present invention to an information processing device that continuously reproduces, in a seamless manner, two multiplexed AV streams consisting of video and audio streams. The present embodiment will propose an audio buffer that has the optimum capacity available at reproduction of the two AV streams that are seamlessly connected to each other provided in a DVR-STD (Digital Video Recording-System Target Decoder).

Firstly, the terms used in the following description are defined. "Clip" denotes a multiplexed stream of video and audio streams. "PlayList" denotes a group of reproduction zones in the Clip. One reproduction zone in some Clip is called "PlayItem", which is represented by a pair of IN point and OUT point on a time axis. That is, PlayList is a group of PlayItem.

"Reproducing PlayItems in a seamless manner" denotes a state where a reproducing device (player) presents (reproduces) audio/video data recorded in a disc while preventing a gap or pause in the reproduction output of a decoder.

A structure in which the two PlayItems are seamlessly connected to each other will be described. Whether seamless presentation of a previous PlayItem and a current PlayItem is assured or not can be judged by connection_condition field defined in the current PlayItem. As the method for realizing seamless connection between PlayItems, a method (first method) using Bridge-Clip (BridgeSequence), and another method (second method) that does not use Bridge-Clip are available.

Figure 1:
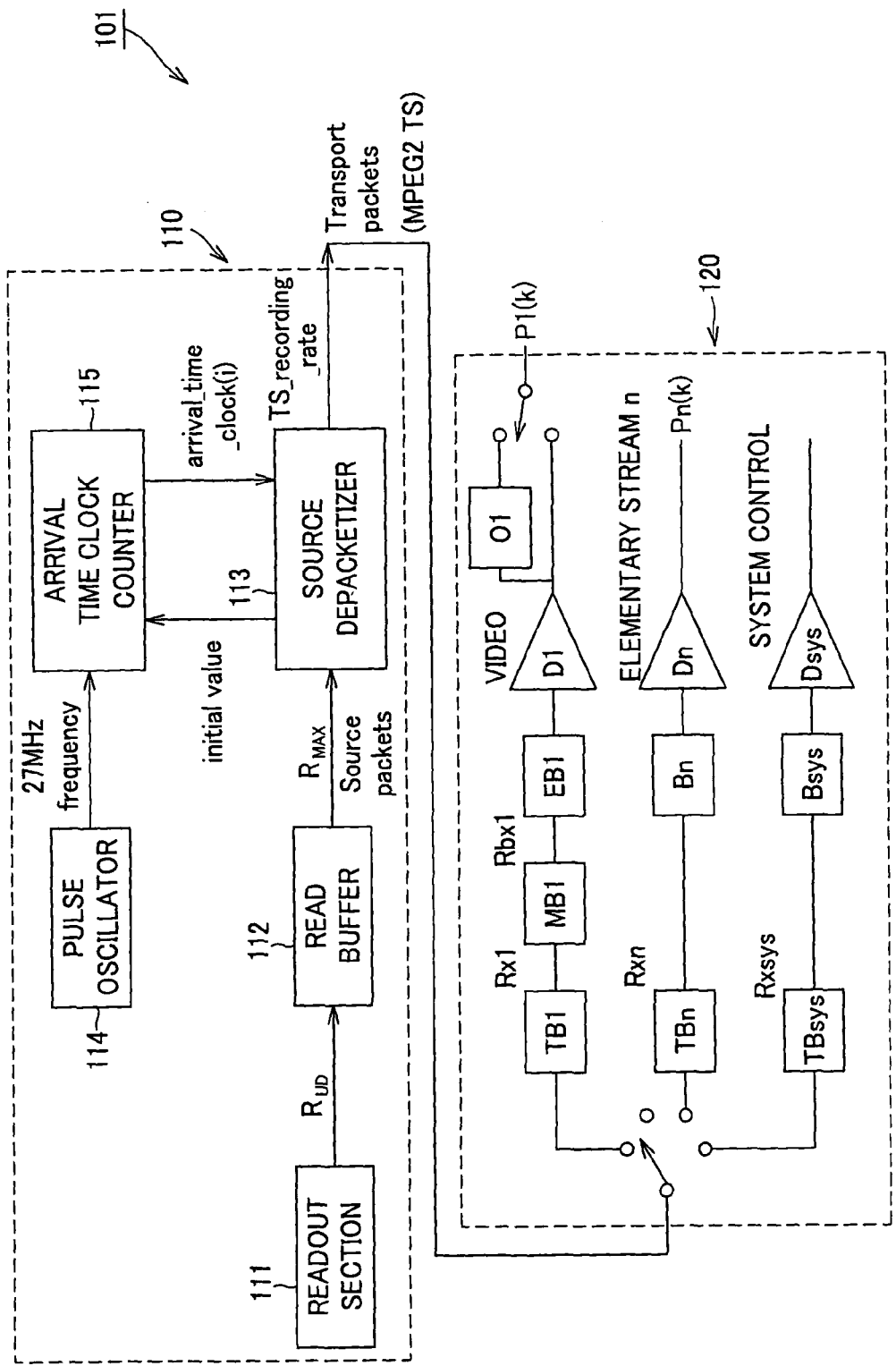
FIG. 1 is a block diagram showing a conventional information processing device.
Figure 2:
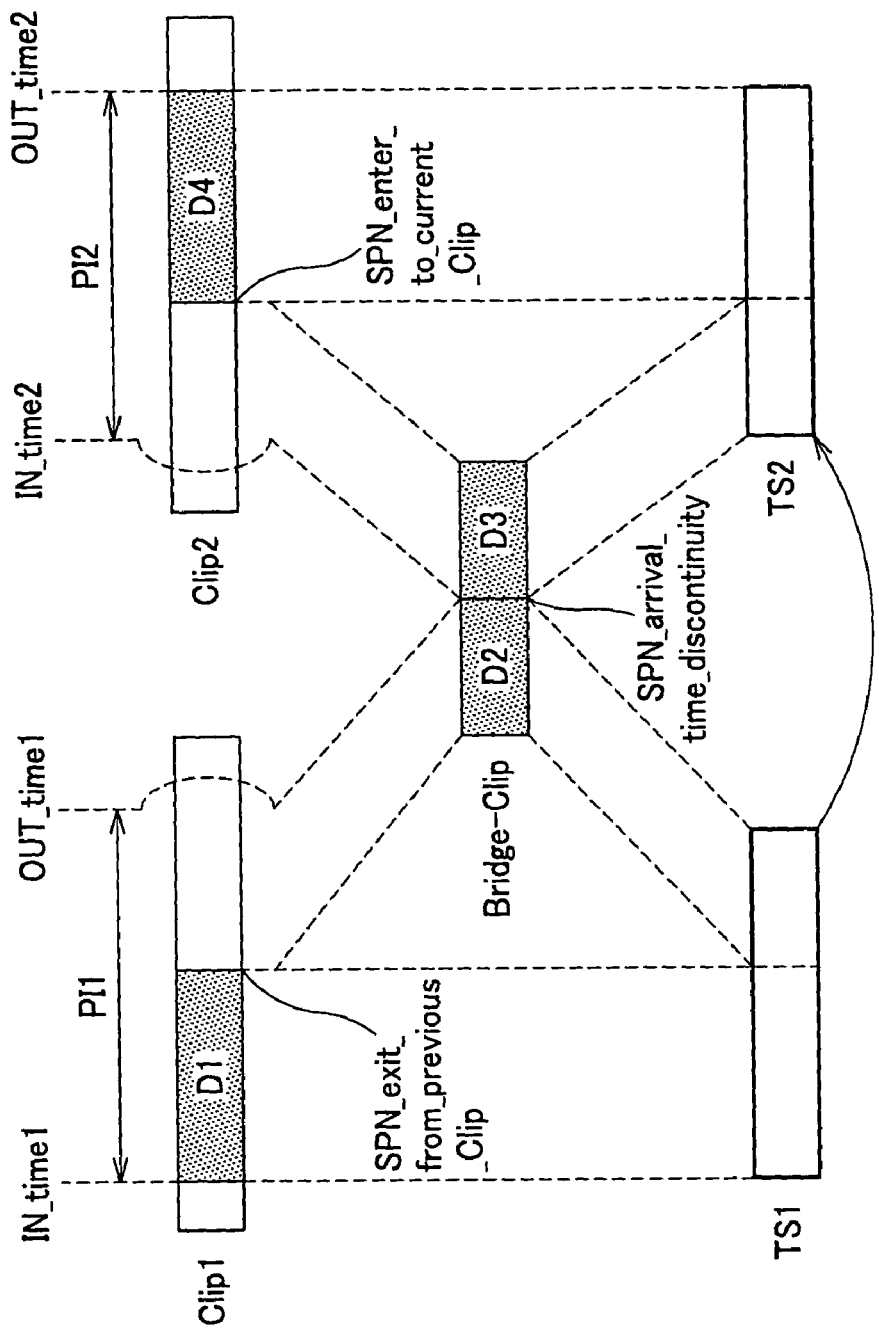
FIG. 2 is a view showing a model of the relation between a previous PlayItem and a current PlayItem in the case of using Bridge-Clip.

Firstly, TS1 and TS2 in the case where the previous PlayItem and the current PlayItem are connected using BridgeSequence (first method) will be described. FIG. 2 is a view showing a model of the relation between a previous PlayItem (PI1) and a current PlayItem (PI2) in the case of using Bridge-Clip (first method). In FIG. 2, the stream data to be read out by a player in the case of using Bridge-Clip are shown in a shaded manner. A DVR MPEG (Moving Picture Experts Group) 2 transport stream (TS) consists of an integer number of Aligned units. Aligned unit has 6,144 bytes (2048×3 bytes). One Aligned unit includes 32 source packets and starts in the first byte of the source packet.

Each source packet has a 192 byte length. One source packet consists of TP_extra_header having a 4 byte length and a transport packet having a 188 byte length. TP_extra_header has copy_premission_indicator and arrival_time_stamp. Copy_premission_indicator is an integer indicating copy restriction of Payload of the transport packet. Arrival_time_stamp (ATS) is a time stamp indicating the time when the corresponding transport packet in AV stream reaches a decoder. The time axis based on arrival_time_stamp of each source packet constituting an AV stream is referred to as arrival time base, and its clock is called ATC (Arrival Time Clock).

TS1 (first multiplexed stream) shown in FIG. 2 consists of stream data D1, which is a shaded part of Clip 1 (Clip AV stream), and stream data D2, which is a part before SPN_arrival_time_discontinuity in the shaded Bridge-Clip. SPN_arrival_time_continuity indicates an address of the source packet at which discontinuity of the arrival time base exists in the Bridge-Clip AV stream file.

The stream data D1 in TS1 corresponding to a shaded part of Clip 1 is stream data from the address of the stream needed for decoding the presentation unit corresponding to IN_time (IN_time 1 in FIG. 2) of a previous PlayItem to the source packet referred to by SPN exit_from_previous Clip.

The stream data D2 in TS1, which is a part before SPN_arrival_time_discontinuity of shaded Bridge-Clip, is stream data from the first source packet in the Bridge-Clip to the source packet immediately before the source packet referred to by SPN_arrival_time_discontinuity.

TS2 (second multiplexed stream) shown in FIG. 2 consists of a stream data D4, which is a shaded part of Clip 2 (Clip AV stream), and a stream data D3, which is a part after SPN_arrival_time_discontinuity in the shaded Bridge-Clip.

The stream data D3 in TS2, which is a part after SPN_arrival_time_discontinuity in the shaded Bridge-Clip, is stream data from the source packet referred to by SPN_arrival_time_discontinuity to the last source packet of Bridge-Clip.

The stream data D4 in TS2, which is a shaded part of Clip 2 is stream data from the source packet referred to by SPN_enter_to_current_Clip to the address of the stream needed for decoding the presentation unit corresponding to OUT_time (OUT_time 2 in FIG. 2) of a current PlayItem.

Figure 3:
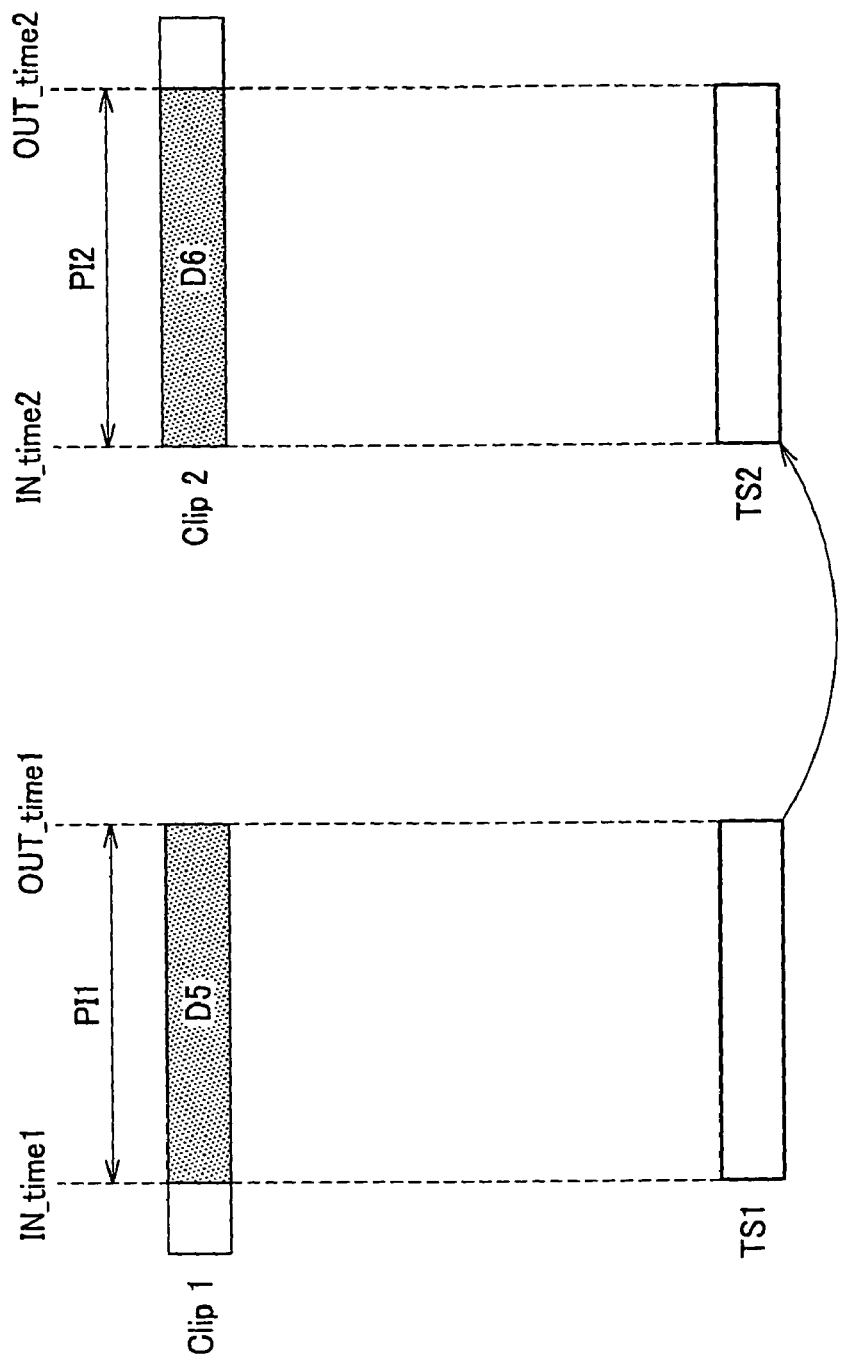
FIG. 3 is a view showing a model of the relation between a previous PlayItem and a current PlayItem in the case of not using BridgeClip.

Next, TS1 and TS2 in the case where the previous PlayItem and the current PlayItem are connected to each other by the second method that does not use BridgeSequence will be described. FIG. 3 is a view showing a model of the relation between the previous PlayItem (PI1) and the current PlayItem (PI2) connected to each other by the second method that does not use BridgeSequence. In FIG. 3, the stream data to be read out by a player are shown in a shaded manner.

TS1 (first multiplexed stream) shown in FIG. 3 includes stream data D5, which is a shaded part of Clip 1 (Clip AV stream). The stream data D5 in TS1, which is a shaded part of Clip 1, is data from the address of the stream needed for decoding the presentation unit corresponding to IN_time (IN_time 1 in FIG. 3) of the previous PlayItem to the last source packet of Clip 1.

TS2 (second multiplexed stream) shown in FIG. 3 consists of stream data D6, which is a shaded part of Clip 2 (Clip AV stream). The stream data D6 in TS2, which is a shaded part of Clip 2, is stream data from the first source packet of Clip 2 to the address of the stream needed for decoding the presentation unit corresponding to OUT_time (OUT_time 2 in FIG. 3) of the current PlayItem.

In FIGS. 2 and 3, TS1 and TS2 constitute a data stream in which source packets are consecutive. Next, a stream regulation of TS1 and TS2, and a connection condition between them will be described.

While TS1 and TS2 are obtained by multiplexing video and audio streams, firstly a restriction on a video bit stream in an encoding restriction for seamless connection will be here described.

Figure 4:
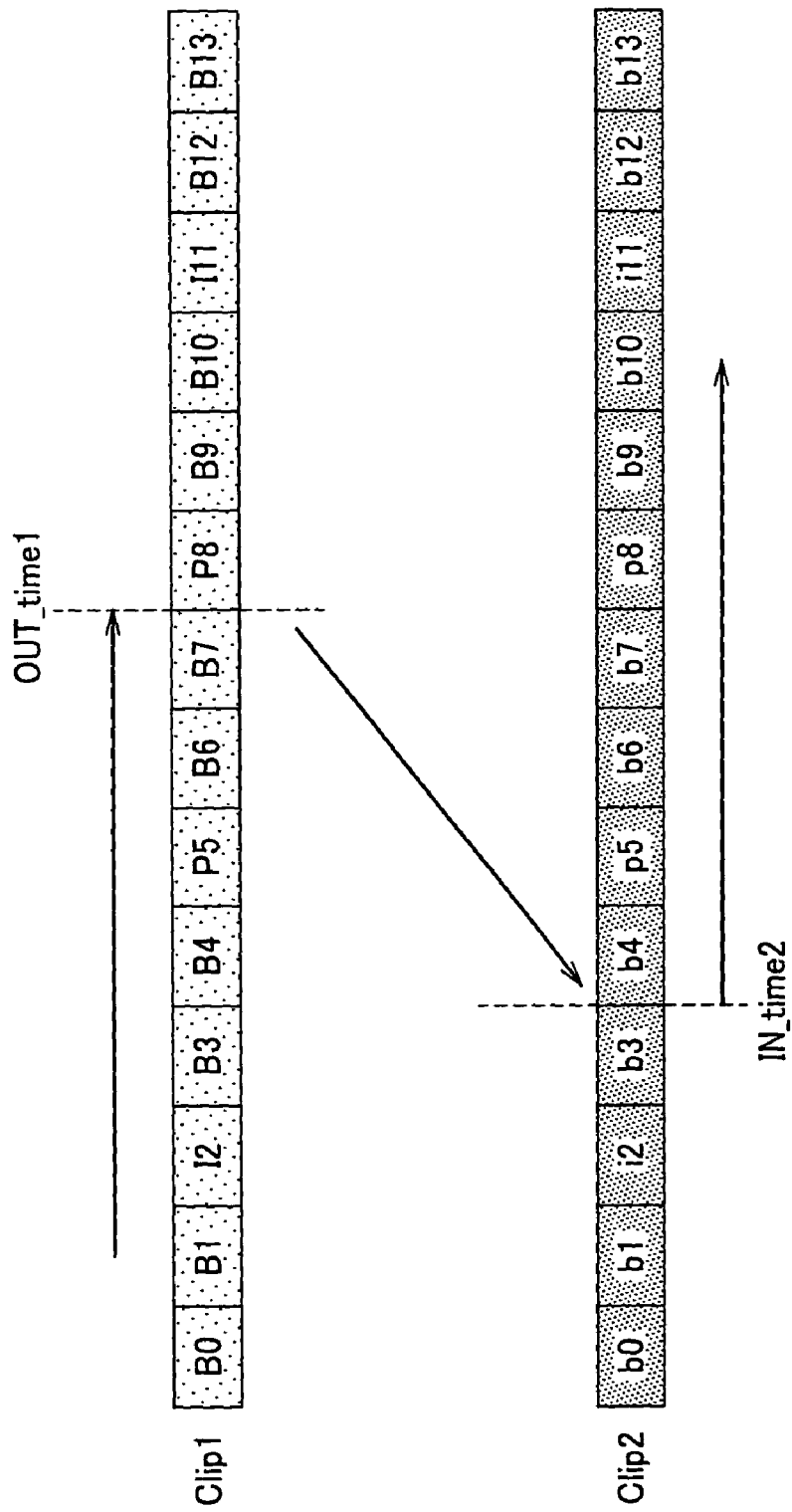
FIG. 4 is a view showing, in the presentation order of pictures, models of Clip 1 and Clip 2, which are video streams to be seamlessly connected to each other.

FIG. 4 is a view showing, in the presentation order of pictures, models of Clip 1 and Clip 2, which are video streams to be seamlessly connected to each other. When a video picture program is reproduced with a part thereof being skipped, it is necessary to perform re-encoding processing of the video stream in a decoding device in order to seamlessly connect an out-point side program, which is positioned before an out-point picture serving as a starting point of skip reproduction and an in-point side program, which is positioned after an in-time picture serving as a reaching point of skip reproduction.

A GOP (group of pictures), a unit of pictures according to MPEG specification includes three types of encoded images: one or more I (Intra) pictures (intra-frame encoded image) each of which are reference images in which an image has been encoded without predictive encoding from other picture, P (predictive) pictures each of which is a forward direction predictive encoded image obtained by encoding an image using predictive encoding in the same direction as the presentation order, and B (bidirectionally) pictures each of which is a bidirectionally predictive encoded image obtained by using predictive encoding in both the forward and reverse directions. In FIG. 4, each number of Clip 1 and Clip 2 denotes the presentation order, and I, P, B, or i, p, b denote types of the picture. FIG. 4 shows the case where B7 of Clip 1 and b4 of Clip 2 are connected. In order to seamlessly present the video stream at the connection point, unnecessary pictures positioned after OUT_time 1 (OUT_time of Clip 1) and before IN_time 2 ($IN_{time}$ of Clip 2) must be removed by the process that encodes partial stream of Clip in the vicinity of the connection point.

FIGS. 5(a), 5(b) and 5(c) show an example in which the video streams (Clip 1 and Clip 2) shown in FIG. 4 are seamlessly connected using BridgeSequence (first method). The video stream of Bridge-Clip before SPN_arrival_time_discontinuity consists of the encoded video stream including pictures before OUT_time 1 of Clip 1 shown in FIG. 4. After the video stream is connected to the previous video stream of Clip 1, the two video streams are re-encoded to be one continuous elementary stream conforming to MPEG2 specification. Similarly, the video stream of Bridge-Clip after SPN_arrival_time_discontinuity consists of the video stream including pictures after IN_time 2 of Clip 2 shown in FIG. 4. The video stream, decoding of which can be started properly, is connected to the subsequent video stream of Clip 2. After that, the connected two video streams are re-encoded to be one continuous elementary stream conforming to MPEG specification. In order to create Bridge-Clip, several pictures must be re-encoded, and other pictures can be obtained by copying the original Clip.

FIG. 5(a) represents Clip 1 shown in FIG. 4 in the presentation order thereof. The player jumps from the source packet number (SPN_exit_from_previous_Clip) of P5 of the previous Clip 1 to Bridge-Clip shown in FIG. 5(b). In D2 of Bridge-Clip shown in FIG. 2, that is, in the stream data on OUT_time 1 side of Clip 1 corresponding to the video data before SPN_arrival_time_discontinuity in BridgeSequence, data d1 including pictures up to B4 consists of the data obtained by copying Clip 1 without change, and data d2, which consists of pictures B6 and B7 of the original Clip 1 in a normal situation, includes P7 and B6 obtained by decoding Clip 1 to non-compressed image data and re-encoding them. Further, also in D3 of Bridge-Clip shown in FIG. 2, that is, in the stream data on IN_time 2 side of Clip 2 corresponding to the video data after SPN_arrival_time_discontinuity in BridgeSequence, pictures b4, p5, p8, b6, b7, of the original Clip 2 become newly created data (i0, p1, p4, b2, b3) d3 obtained by once decoding Clip 2 to non-compressed image data and re-encoding them. Data d4 before jumping to SPN_enter_to_current_Clip is obtained by copying Clip 2 without change.

Figure 5:
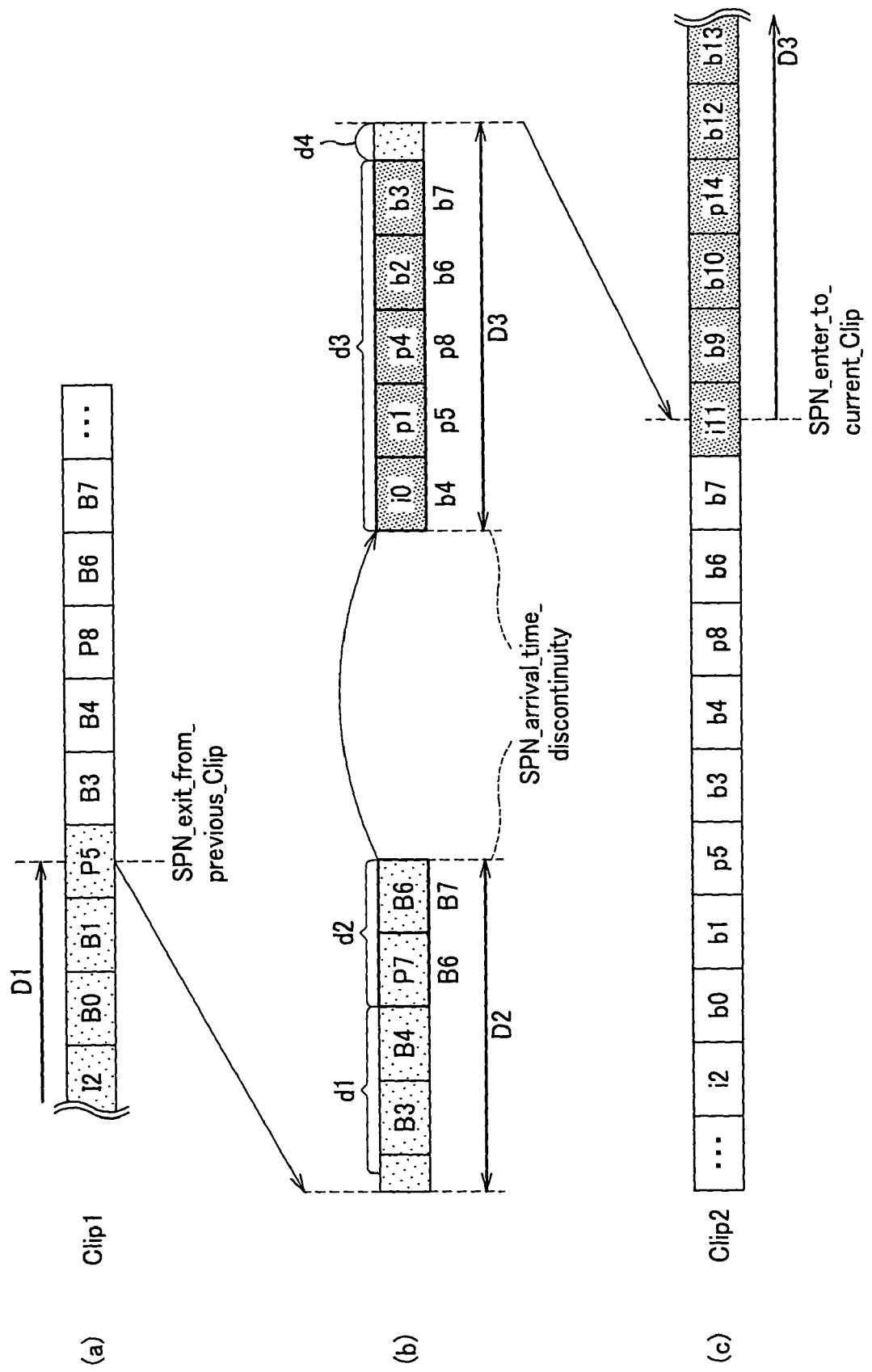
FIGS. 5(a), 5(b) and 5(c) show an example of a data stream in each AV stream in which the video streams (Clip 1 and Clip 2) shown in FIG. 4 are seamlessly connected using BridgeSequence (first method)
Figure 6:
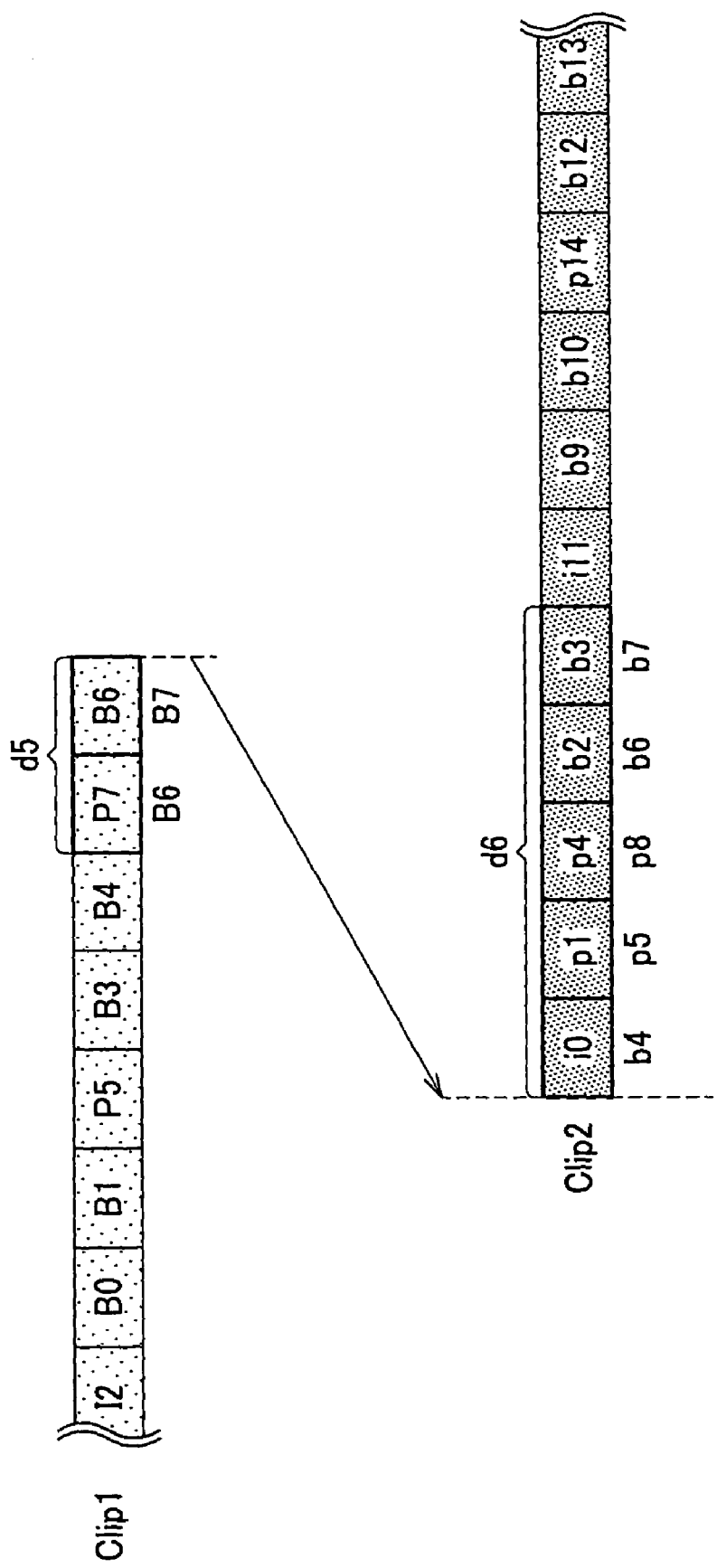
FIG. 6 shows an example of a data stream in each AV stream in which the video streams (Clip 1 and Clip 2) shown in FIG. 4 are seamlessly connected by using the second method that does not use BridgeSequence.

FIG. 6 shows an example in which the video streams (Clip 1 and Clip 2) shown in FIG. 4 are seamlessly connected by using the second method that does not use BridgeSequence. In Clip 1 and Clip 2 shown in FIG. 6, pictures are arranged in the presentation order. Even in the case where Bridge Sequence is not used, the stream in the vicinity of the connection point is once decoded to non-compressed data and re-decoded to the optimum picture type, as in the same way where BridgeSequence is used as shown in FIG. 5. That is, the video stream of Clip 1 includes the encoded video stream up to the picture corresponding to OUT_time 1 shown in FIG. 4, wherein B6, B7 of the original Clip 1 are re-encoded to data (P7, B6) d5 so as to be one continuous elementary stream conforming to MPEG2 specification. Similarly, the video stream of Clip 2 includes the encoded video stream after picture corresponding to IN_time 2 of Clip 2 shown in FIG. 4, wherein b4, p5, p8, b6, b7 of the original Clip 2 are re-encoded to data (i0, p1, p4, b2, b3) d6 so as to be one continuous elementary stream conforming to MPEG2 specification.

Figure 7:
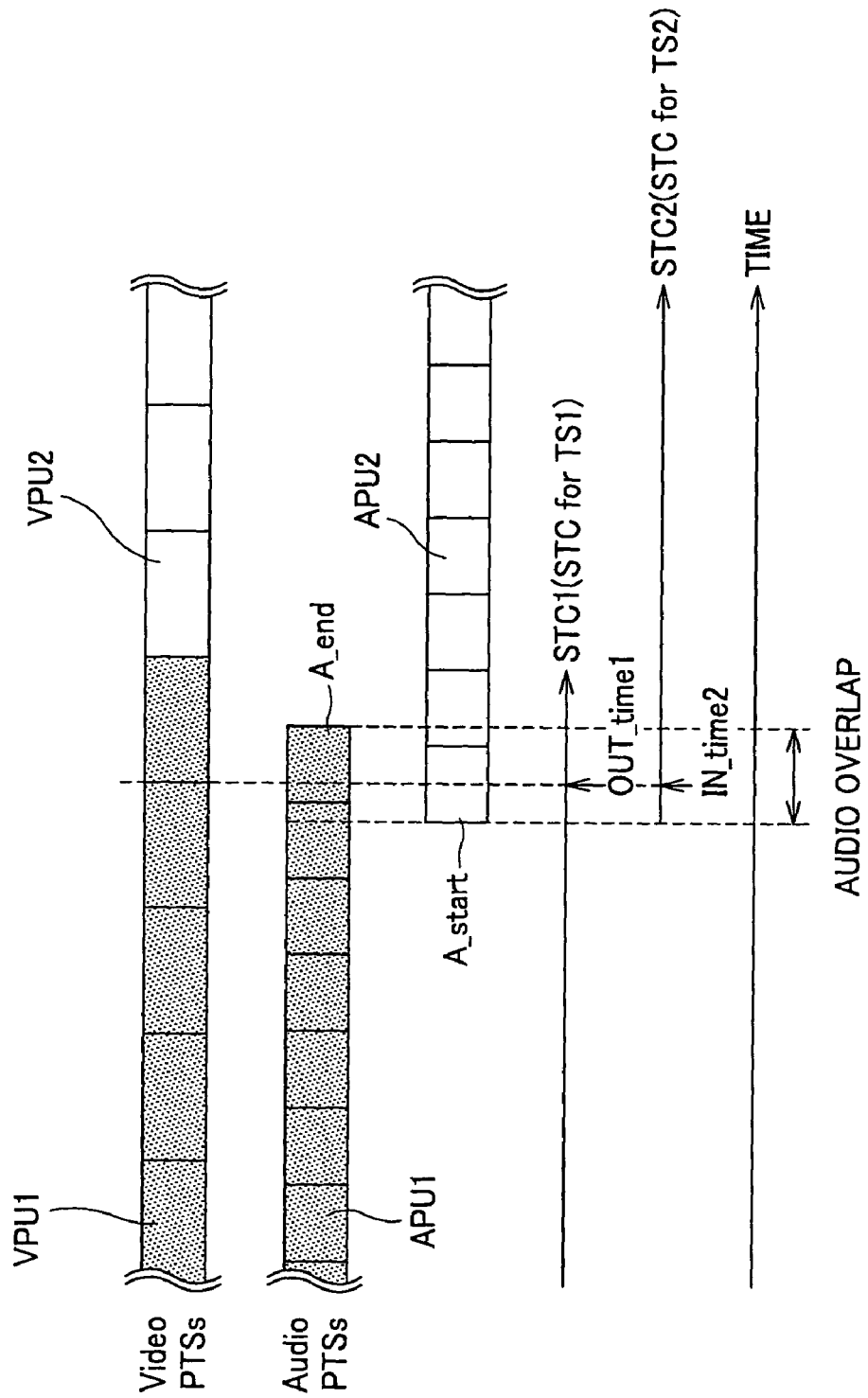
FIG. 7 is a view for explaining an overlap of audio presentation, and shows a model of video presentation units and audio presentation units in TS1 and TS2.

Next, the encoding restriction of multiplexed streams of TS1 and TS2 will be described. FIG. 7 is a view for explaining an overlap of audio presentation, and shows a model of video presentation units VPU1 and VPU2 and audio presentation units APU1 and APU2 in TS1 and TS2.

As shown in FIG. 7, the last audio frame A_end of the audio stream of TS1 includes an audio sample having the presentation time equal to the presentation end time (OUT_time1) of the last presentation picture of TS1. The first audio frame A_start of the audio stream of TS2 includes an audio sample having the presentation time equal to the presentation start time (IN_time2) of the first presentation picture of TS2. Thus, no gap exists in the sequence of audio presentation units at the connection point between TS1 and TS2, and an audio overlap defined by the length of audio presentation unit less than 2 audio frames is generated. TS at the connection point is DVR MPEG2 TS according to DVR-STD (Digital VideoRecording-system Target Decoder) to be described later.

Figure 8:
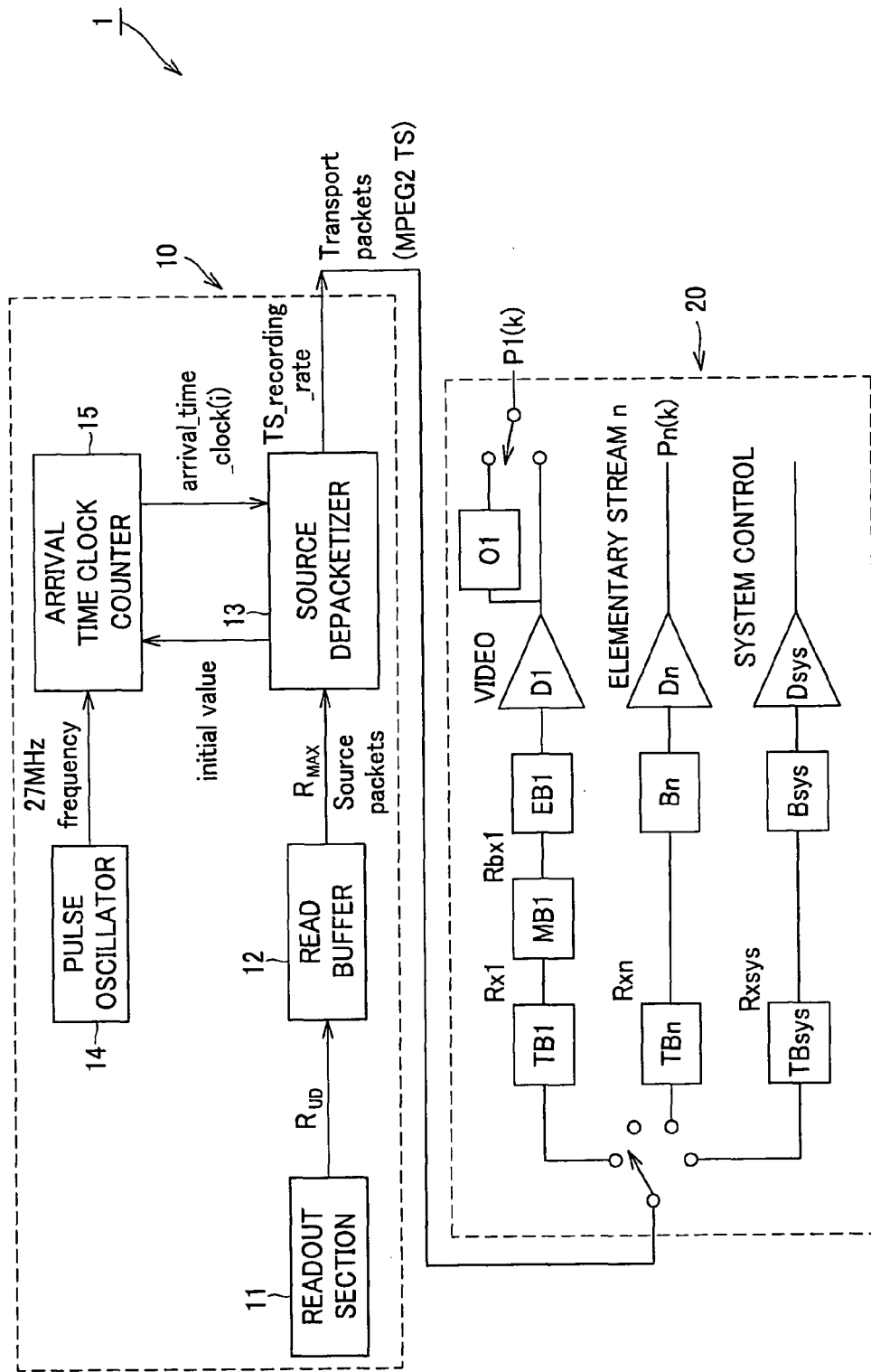
FIG. 8 is a block diagram showing an information processing device according to the embodiment of the present invention.

DVR-STD is a conceptual model for modeling decode processing in generating and examining the AV stream referred to by two PlayItems that have been connected seamlessly to each other. FIG. 8 shows the DVR-STD model (DVR MPEG2 transport stream player model).

As shown in FIG. 8, an information processing device (DVR MPEG2 transport stream player model, which is hereinafter referred to as "player") 1 according to the embodiment includes an output section 10 that reads out transport packets from TS connected for seamless reproduction and outputs them, and a decoder (DVR-STD) 20 that decodes transport packets from the output section 10. As described later, the decoder 20 has been obtained by changing the input timing of transport packets and capacity of audio buffer in the aforementioned conventional DVR-STD. In the output section 10, the TS file read out at a readout rate RuD from a readout section (DVRdrive) 11 is buffered in a read buffer 12. From the read buffer 12, a source packet is read out into a source depacketizer 13 at a bit rate $R_{MAX}$. $R_{MAX}$ is a bit rate of a source packet stream.

A pulse oscillator (27 MHz X-tal) 14 generates a 27 MHz pulse. An arrival time clock counter 15 is a binary counter that counts the 27 MHz frequency pulse, and supplies the source depacketizer 13 with Arrival_time_clock(i) which is a count value of Arrival time clock counter at time t(i).

As described above, one source packet includes one transport packet and its arrival_time_stamp. When arrival_time_stamp of the current source packet is equal to the value of LSB 30 bit of arrival_time_clock(i), a transport packet of the current source packet is output from the source depacketizer 13. TS_recording_rate is a bit rate of TS.

Notations of n, TBn, MBn, EBn, TBsys, Bsys, Rxn, Rbxn, Rxsys, Dn, Dsys, On, and Pn(k) shown in FIG. 8 are the same as those defined in T-STD (transport stream system target decoder specified by ISO/IEC 13818-1) of ISO/IEC13818-1 (MPEG2 systems specification). That is, as follows.
n: index number of elementary stream
TBn: transport buffer of elementary stream n
MBn (exists only in video stream): multiplexing buffer of elementary stream n
EBn: elementary stream buffer of elementary stream n, which exists only in video stream
TBsys: input buffer for system information of the program that is being decoded
Bsys: main buffer in system target decoder for system information of the program that is being decoded
Rxn: transfer rate at which data is removed from TBn
Rbxn (exists only in video stream): transfer rate at which PES packet payload is removed from MBn
Rxsys: transfer rate at which data is removed from TBsys
Dn: decoder of elementary stream n
Dsys: decoder related to system information of the program that is being decoded
On: re-ordering buffer of video stream n
Pn (k): k-th presentation unit of elementary stream n Next, decoding process of the decoder 20 will be described. Firstly, the decoding process during reproduction of a single DVR MPEG2 TS will be described.

During reproduction of a single DVR MPEG2 TS, the timing at which the transport packet is input to the buffer TB1, TBn or TBsys is determined by arrival_time_stamp of the source packet.

Buffering operations of TB1, MB1, EB1, TBn, Bn, TBsys and Bsys are specified in a similar manner as in the T-STD specified by ISO/IEC 13818-1. Decoding and presentation operations thereof are also specified in a similar manner in the T-STD specified by ISO/IEC 13818-1.

Figure 9:
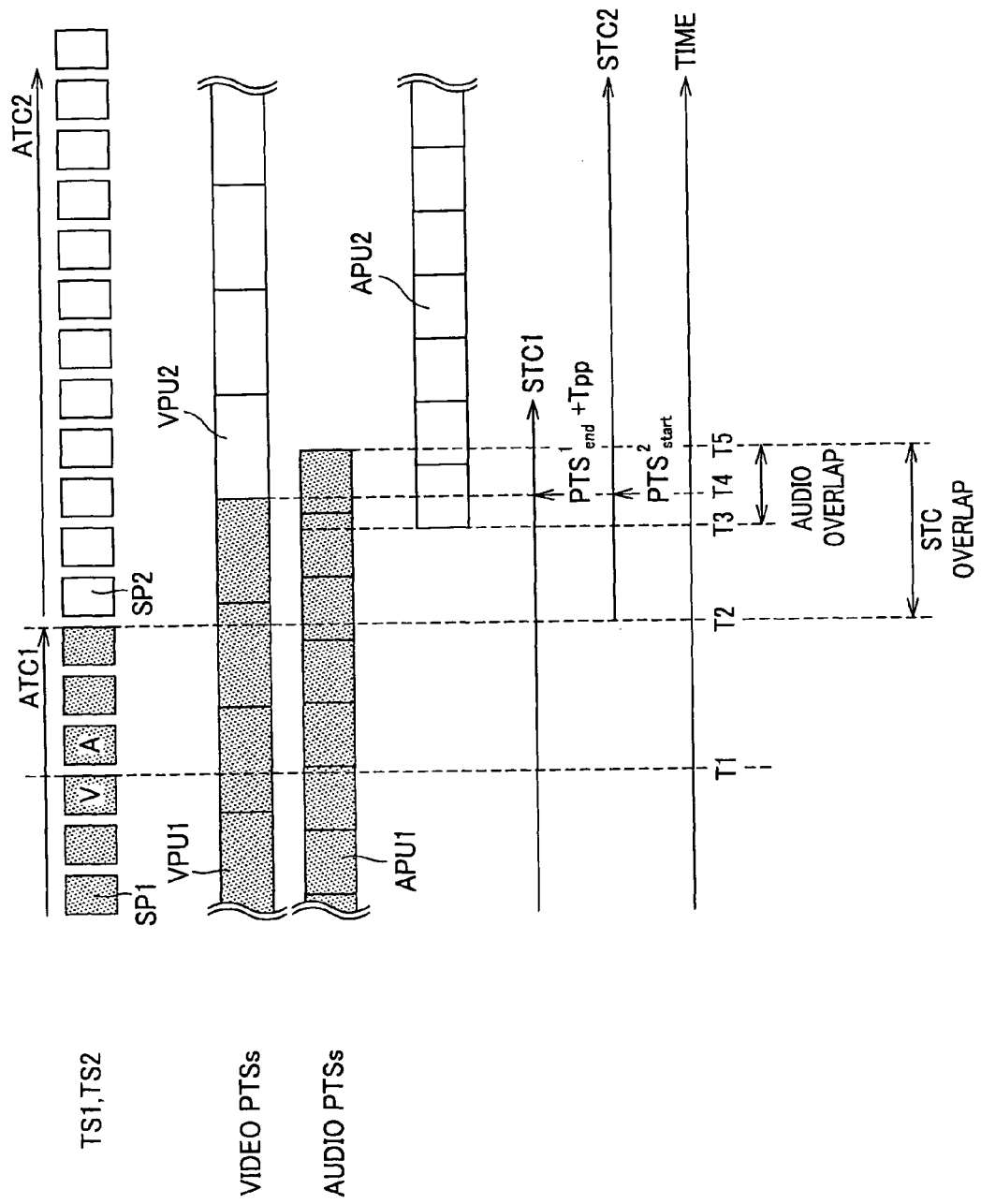
FIG. 9 is a timing chart of input, decoding, and presentation of the transport packet during the shift between a certain AV stream (TS1) and the next AV stream (TS2) seamlessly connected to the AV stream (TS1)

Next, decoding process during reproduction of PlayItems that are seamlessly connected will be described. FIG. 9 is a timing chart of input, decoding, and presentation of the transport packet during the shift between a certain AV stream (TS1) and the next AV stream (TS2) seamlessly connected to the AV stream (TS1).

Here, a description is given of two AV streams that are referred to by seamlessly connected PlayItem. In the later description, reproduction of TS1 and TS2 that have been seamlessly connected, shown in FIG. 2 or FIG. 3, will be described. That is, TS1 is the previous stream, and TS2 is the current stream. Respective packets sectioned by TS1 and TS2 represent source packets SP1 and SP2 of TS1 and TS2.

During the shift between a certain AV stream (TS1) and the next AV stream (TS2) seamlessly connected to the AV stream (TS1), the time axis (ATC 2 in FIG. 9) of TS2 arrival time base is not the same as that (ATC 1 in FIG. 9) of TS1 arrival time base. Further, the time axis (STC2 in FIG. 9) of TS2 system time base is not the same as that (STC1 in FIG. 9) of TS1 system time base. The presentation of video images needs to be seamless. An overlap may exist in the presentation time of audio presentation unit.

In the player 1 of the present embodiment, the audio buffer having the optimum capacity is obtained by changing the following two points with respect to the aforementioned player 101 discribed in Jpn. Pat. Appln. Laid-Open Publication No. 2000-175152, Jpn. Pat. Appln. Laid-Open Publication No. 2001-544118, and Jpn. Pat. Appln. Laid-Open Publication No. 2002-158974. The description begins with the first changing point. The first changing point is that input of the packets of TS1 up to the last packet into the decoder 20 is determined by arrival_time_stamp of their source packets during the shift between a certain AV stream (TS1) and the next AV stream (TS2) seamlessly connected to the AV stream (TS1).

That is, as described above, in the conventional player 101, the transport packet is input to the buffer at the maximum bit rate of TS with arrival_time_stamp ignored between time T1 when the last video packet of TS1 has been input to TB1 and time T2 when the input of the last byte of TS1 has been completed, whereas in the present embodiment, input of the source packet between T1 and T2 is determined by arrival_time_stamp of the source packets of TS1 as with the case of before time T1. This eliminates the additional buffer corresponding to 1 second that has been conventionally required for inputting the transport packet at the maximum bit rate $R_{max}$ of TS with arrival_time_stamp of the source packet ignored.

The input timing to the decoder 20 in this case will be described with reference to FIG. 9.

(1) Before Time T1

Before time T1, that is, until the input of the last video packet of TS1 to the decoder 20 has been completed, the input timing to the buffer TB1, TBn or TBsys of the decoder 20 is determined by arrival_time_stamp of the source packet SP1 of TS1.

(2) From Time T1 to Time T2

The input timing of the remaining packets of TS1 to the decoder 20 is also determined by arrival_time_stamp of the source packet SP1 of TS1. The time when the last byte of TS1 is input to the buffer is time T2.

(3) After Time T2

At time T2, the arrival time clock counter 15 is reset to the value of arrival_time_stamp of the first source packet of TS2. The input timing to the buffer TB1, TBn or TBsys of the decoder 20 is determined by arrival_time_stamp of the source packet SP2 of TS2.

That is, the input timing to the buffer TB1, TBn or TBsys of the decoder 20 is determined by arrival_time_stamp of the source packet SP1 of TS1 before time T2 at which the input of the last byte of TS1 to the decoder 20 has been completed, and determined by arrival_time_stamp of the source packet SP2 of TS2 after time T2.

Next, video presentation timing will be described. A video presentation unit must be presented seamlessly through the aforementioned connection points as shown in FIGS. 2 and 3. That is, the last video data (first picture) of TS1 and the first video data (second picture) of TS2 are reproduced seamlessly. It is assumed that STC1: time axis of TS1 system time base STC2: time axis of TS2 system time base (correctly, STC2 starts from the time when the first PCR (Program Clock Reference) of TS2 has been input to T-STD).

An offset value between STC1 and STC2 is determined as follows.

Assuming that $PTS1_{end}$: PTS on STC1 corresponding to the last video presentation unit of TS1

$PTS2_{start}$: PTS on STC2 corresponding to the first video presentation unit of TS2

$T_{pp}$: presentation period of the last video presentation unit of TS1,

Offset value STC_delta between two system time bases is represented by the following equation (6).

$$STC\_delta = PTS1_{end} + T_{pp} - PTS2_{start} \quad (6)$$

Next, audio presentation timing will be described. An overlap of the presentation timing of the audio presentation unit may exist at the connection point of TS1 and TS2, the overlap being from 0 to less than 2 audio frames (refer to audio overlap in FIG. 9). The player 101 must select one of the audio samples and re-synchronize the presentation of the audio presentation unit with the corrected time base after the connection point.

The processing for control of system time clock of the decoder 20 carried out by the player when the time shifts from TS1 to TS2 seamlessly connected to TS1 will be described.

At time T5, the last audio presentation unit of TS1 is presented. The system time clocks may be overlapped between time T2 and T5. Between time T2 and T5, the decoder 20 switches the system time clock from the value (STC1) of the old time base to the value (STC2) of the new time base. The value of STC2 can be represented by the following equation (7).

$$STC2 = STC1 - STC\_delta \quad (7)$$

A coding condition that TS1 and TS2 must meet when the time shifts from TS1 to TS2 seamlessly connected to TS1 will be described.

It is assumed that $STC1^{1}_{end}$: value of STC on system time base STC1 when the last byte of the last packet of TS1 has reached the decoder 20

$STC2^2_{start}$: value of STC on system time base STC2 when the first byte of the first packet of TS2 has reached the decoder 20

$STC2^1_{end}$: value obtained by converting the value of $STC1^1_{end}$ to the value on system time base STC2.

In this case, $STC2^1_{end}$ is represented by the following equation (8).

$$STC2^1_{end} = STC1^1_{end} - STC\_delta \quad (8)$$

It is necessary to meet the following two conditions in order for the decoder 20 to conform to the DVR-STD.
(Condition 1)

The timing at which the first packet of TS2 reaches decoder 20 must meet the following inequality (9).

$$STC2^2_{start} > STC2^1_{end} \quad (9)$$

The partial streams of Clip 1 and/or Clip 2 need to be re-encoded and/or re-multiplexed in order to meet the above inequality (9).
(Condition 2)

On the time axis of the system time base obtained by converting STC1 and STC2 to the same time axis as each other, inputs of the video packet from TS1 and subsequent video packet from TS2 should not overflow and underflow the video buffer. Further, on the time axis of the system time base obtained by converting STC1 and STC2 to the same time axis as each other, inputs of the packet from TS1 and subsequent packet from TS2 should not overflow and underflow all the buffer in the decoder 20.

Figure 10:
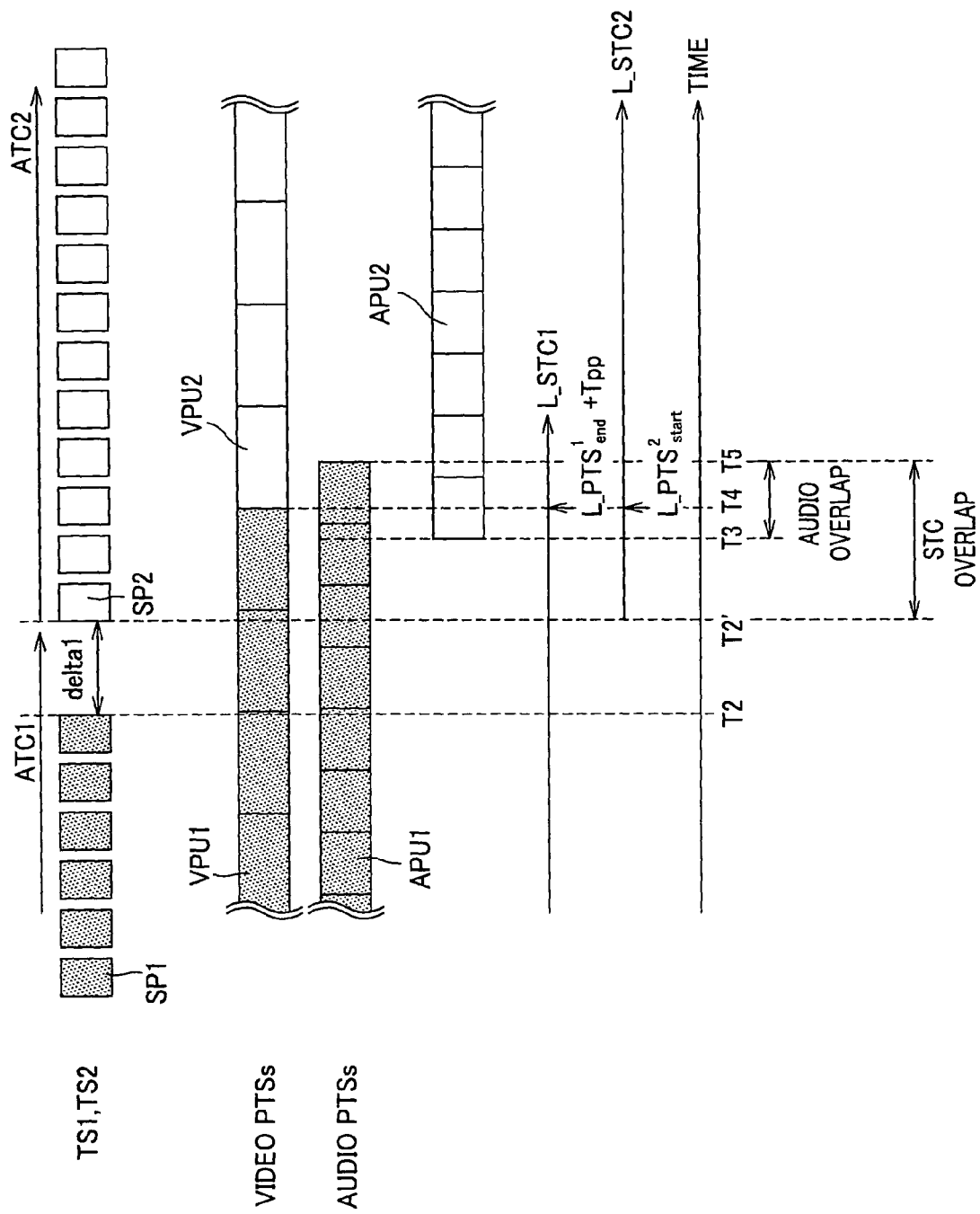
FIG. 10 is another example of timing chart of input, decoding, and presentation of the transport packet during the shift between a certain AV stream (TS1) and the next AV stream (TS2) seamlessly connected to the AV stream (TS1)

FIG. 10 is another example of timing chart of input, decoding, and presentation of the transport packet during the shift between a certain AV stream (TS1) and the next AV stream (TS2) seamlessly connected to the AV stream (TS1). Also in this case, the input timing of packets up to the last packet of TS1 to the decoder 20 is determined by arrival_time_stamp of their source packets. One point that differs from the timing chart shown in FIG. 9 is that a predetermined time interval (delta1: interval between time T2 and T2') is provided, as shown in FIG. 10, so as to eliminate the need to input the first packet of TS2 immediately after the last packet of TS1. As a result, determination of the input timing of the first packet of TS2 becomes more flexible than in the case of FIG. 9, which makes it easy to encode TS2.

The input timing to the decoder 20 in this case will be described with reference to FIG. 10.

(1) Before Time T2

Before time T2, that is, until the input of the last byte of the last packet of TS1 to the decoder 20 has been completed, the input timing to the buffer TB1, TBn or TBsys of the decoder 20 is determined by arrival_time_stamp of the source packet SP1 of TS1.

(2) After Time T2'

When the time has reached time T2' through the time T2 and delta1, the arrival time clock counter 15 is reset to the value of arrival_time_stamp of the first source packet of TS2. The input timing to the buffer TB1, TBn or TBsys of the decoder 20 is determined by arrival_time_stamp of the source packet SP2 of TS2.

In the case where the delta1 is provided as shown in FIG. 10, the aforementioned $STC2^2_{start}$ and $STC2^1_{end}$ must meet the following relational expression (10).

$$STC2^2_{start} > STC2^1_{end} + delta1 \quad (10)$$

Figure 11:
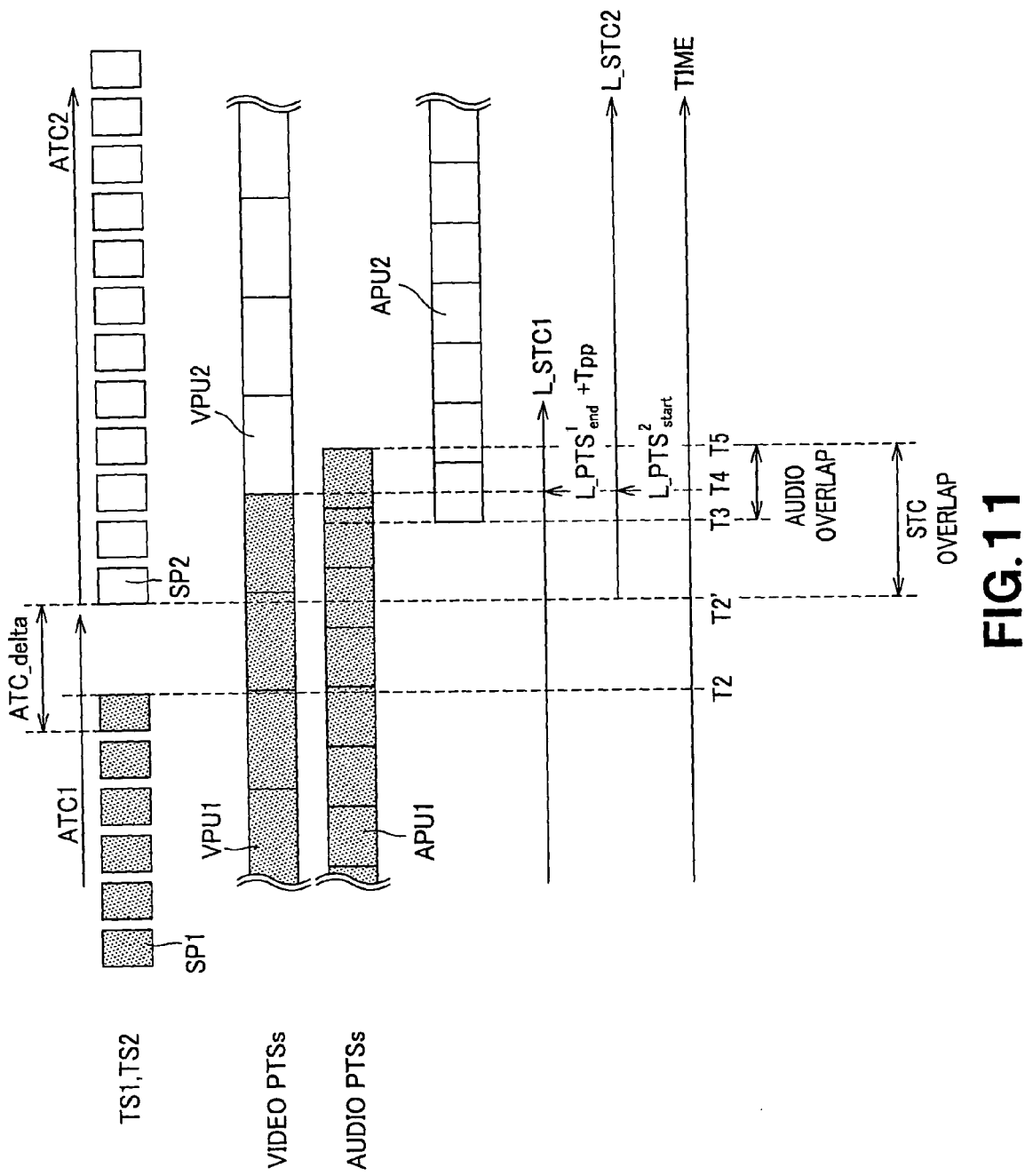
FIG. 11 is another example of timing chart of input, decoding, and presentation of the transport packet during the shift between a certain AV stream (TS1) and the next AV stream (TS2) seamlessly connected to the AV stream (TS1)

FIG. 11 is another example of timing chart of input, decoding, and presentation of the transport packet during the shift between a certain AV stream (TS1) and the next AV stream (TS2) seamlessly connected to the AV stream (TS1). Also in this case, the input timing of packets up to the last packet of TS1 to the decoder 20 is determined by arrival_time_stamp of their source packets. One point that differs from the timing chart shown in FIG. 10 is that a predetermined time interval (ATC_delta: interval between time T2 and T2') is provided, as shown in FIG. 11. As a result, determination of the input timing of the first packet of TS2 becomes more flexible than in the case of FIG. 9, which makes it easy to encode TS2.

The input timing to the decoder 20 in this case will be described with reference to FIG. 11.

(1) Before Time T2

Before time T2, that is, until the input of the last byte of the last packet of TS1 to the decoder 20 has been completed, the input timing to the buffer TB1, TBn or TBsys of the decoder 20 is determined by arrival_time_stamp of the source packet SP1 of TS1.

(2) From time T2 to time T2'

Time T2' is the time at which the first packet of TS2 is input to the decoder 20. ATC_delta is an offset time from arrival_time_stamp (time on ATC1) of the last packet of TS1 to time T2' that has been projected on the ATC1.

(3) After Time T2'

At time T2', the arrival time clock counter 15 is reset to the value of arrival_time_stamp of the first source packet of TS2. The input timing to the buffer TB1, TBn, or TBsys of the decoder 20 is determined by arrival_time_stamp of the source packet SP2 of TS2.

The value of ATC_delta is so determined as to meet STC_delta of the above equation (6).

The value of ATC_delta is managed as attachment information of stream data. When TS1 and TS2 are connected seamlessly to each other as shown in FIG. 11, the value of ATC_delta is managed as attachment information of TS1.

FIG. 12 shows a data format of attachment information ClipInfo ( ) for storing ATC_delta.

Figure 13:
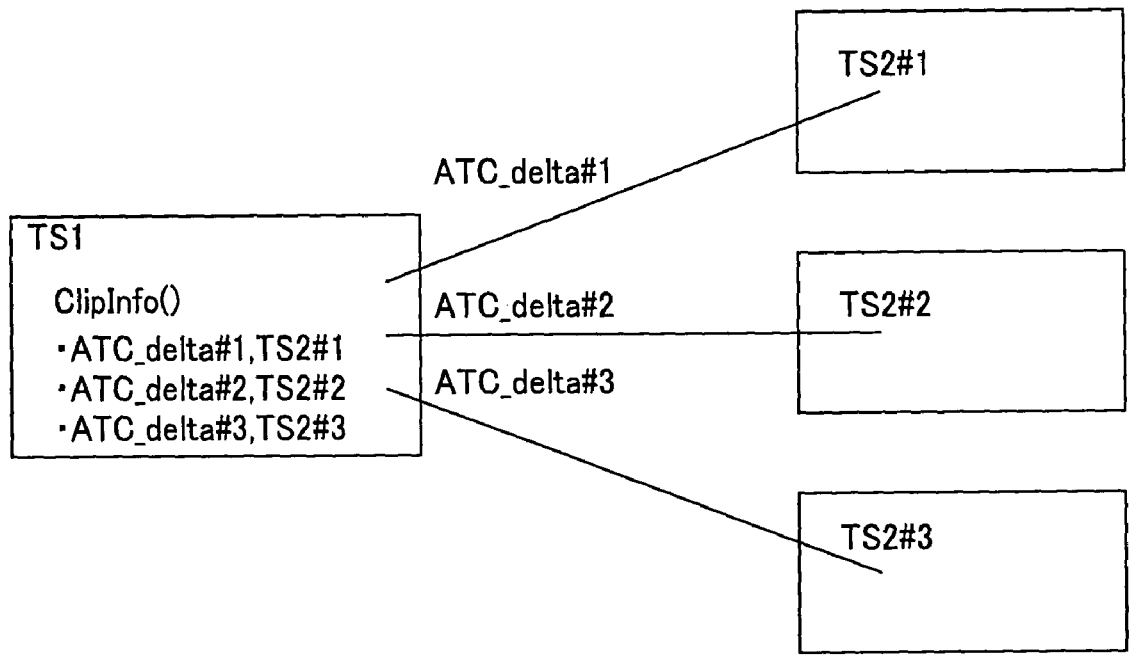
FIG. 13 is a view showing a model of attachment information ClipInfo ( ) in the case where a plurality of AV streams (TS2s) to be connected to a certain AV stream (TS1)

In FIG. 12, is_ATC_delta is a flag indicating whether ClipInfo ( ) has the value of ATC_delta. A plurality of values can be registered in ClipInfo ( ) for allowing a plurality of TS2s to be connected to TS1 as shown in FIG. 13. When is_ATC_delta flag is 1, number_of_ATC_delta_entries denotes the number of ATC_deltas that have been registered in ClipInfo ( ).

Further, in FIG. 12, following _Clip_Infromation_file_name is a name of a stream of TS2 to be connected to TS1. When there exist a plurality of TS2s that correspond to following _Clip_Infromation_file_name, the values of ATC_delta that correspond to respective TS2s are registered in ClipInfo ( ).

When TS1 and TS2 are input to the DVR-STD model in FIG. 8, multiplexed streams thereof and their attachment information ClipInfo ( ) are input. ClipInfo ( ) includes information of the aforementioned ATC_delta, which is handled with a predetermined method by a controller (not shown in FIG. 8) of the DVR-STD model in the shift between TS1 and TS2, as described above.

The second changing point is that the size of the decoder 20 is changed to the size large enough to meet the following condition. The condition is that the picture (I picture) to be decoded first in TS2 can be input to the video buffer by the decode timing thereof after the input of the last transport packet of TS1 has been completed during the shift between TS1 and TS2 seamlessly connected to the TS1.

The maximum value of the capacity of the audio buffer needed to meet the above condition is as follows. That is, the size capable of storing the audio data amount having a length corresponding to "time large enough to input the maximum bit amount of I picture to the video buffer by the decode timing thereof" is required. The maximum value EBn_max of the requirement of the audio buffer can be represented by the following equation (11).

$$EBn\_max=(I\_max/Rv)*Ra \text{ [bits]} \tag{11}$$

Where I_max is a maximum bit amount of I picture, which corresponds to the size of the video code buffer EB1 shown in FIG. 8, Rv is an input bit rate to the video code buffer EB1, and Ra is a bit rate of an audio stream. As shown in the above equation (11), the size EBn_max of the audio buffer to be calculated is the value obtained by multiplying the time required for making the buffer occupation amount of the video code buffer EB1 increase from 0 to I_max at an input bit rate to the video elementary stream buffer (EB1) by Ra.

As a concrete value, the buffer size that can store the audio data corresponding to at least 100 milliseconds is recommended. The reason is as follows. That is, when I picture is encoded every 0.5 seconds, the bit size of I picture is generally 10% or less of the encoding bit rate. Assuming that the encoding bit rate is, for example, 10 Mbps, the size of I picture is 1 Mbits or less in general.

Thus, as the first reason, with at least 100 milliseconds, I picture can be input to the video buffer of the decoder 20 by the decode timing thereof. Further, as the second reason, if the audio buffer of the decoder 20 can store the audio data corresponding to 100 milliseconds, it is possible to multiplex TS1 so that input of the audio data to the audio buffer is completed 100 milliseconds earlier than reproduction timing of the audio data. Therefore, when the audio buffer has the buffer size that can store at least audio data corresponding to 100 milliseconds, it is possible to assure, for the above first and second reasons, at least 100 milliseconds as the time until which the input of the picture (I picture) to be decoded first in TS2 to the video buffer has been completed after the input of the last transport packet of TS1 had been completed during the shift between TS1 and TS2 seamlessly connected to the TS1.

The capacity of the audio buffer that can store the audio data corresponding to 100 milliseconds is concretely calculated below.

In the case of Dolby AC3 audio stream of 640 kbps: 640 kbps×0.1 sec=64 kbits=8 kbytes In the case of Linear PCM audio stream (24 bit sample, 96 KHz sampling frequency, 8 channels): (24 bitSample*96,000 samples/sec*8 ch)×0.1 sec=230,400 bytes The advantage obtained by changing the size of audio buffer of DVR-STD to "the size that can store the amount of the audio data corresponding to the time large enough to input the picture (I picture) to be decoded first in TS2 to the video buffer by the decode timing thereof" like the decoder 20 of the present embodiment described above will be described in detail with reference to FIGS. 14 and 15.

Here, AC3 audio stream having a bit rate of 640 kbps and a sampling frequency of 48 kHz will be explained as an example. The sample number of one audio frame of AC3 audio stream is 1,536. Accordingly, the time length of one audio frame is 32 milliseconds. The byte size of one audio frame is 2,560 bytes.

Figure 14:
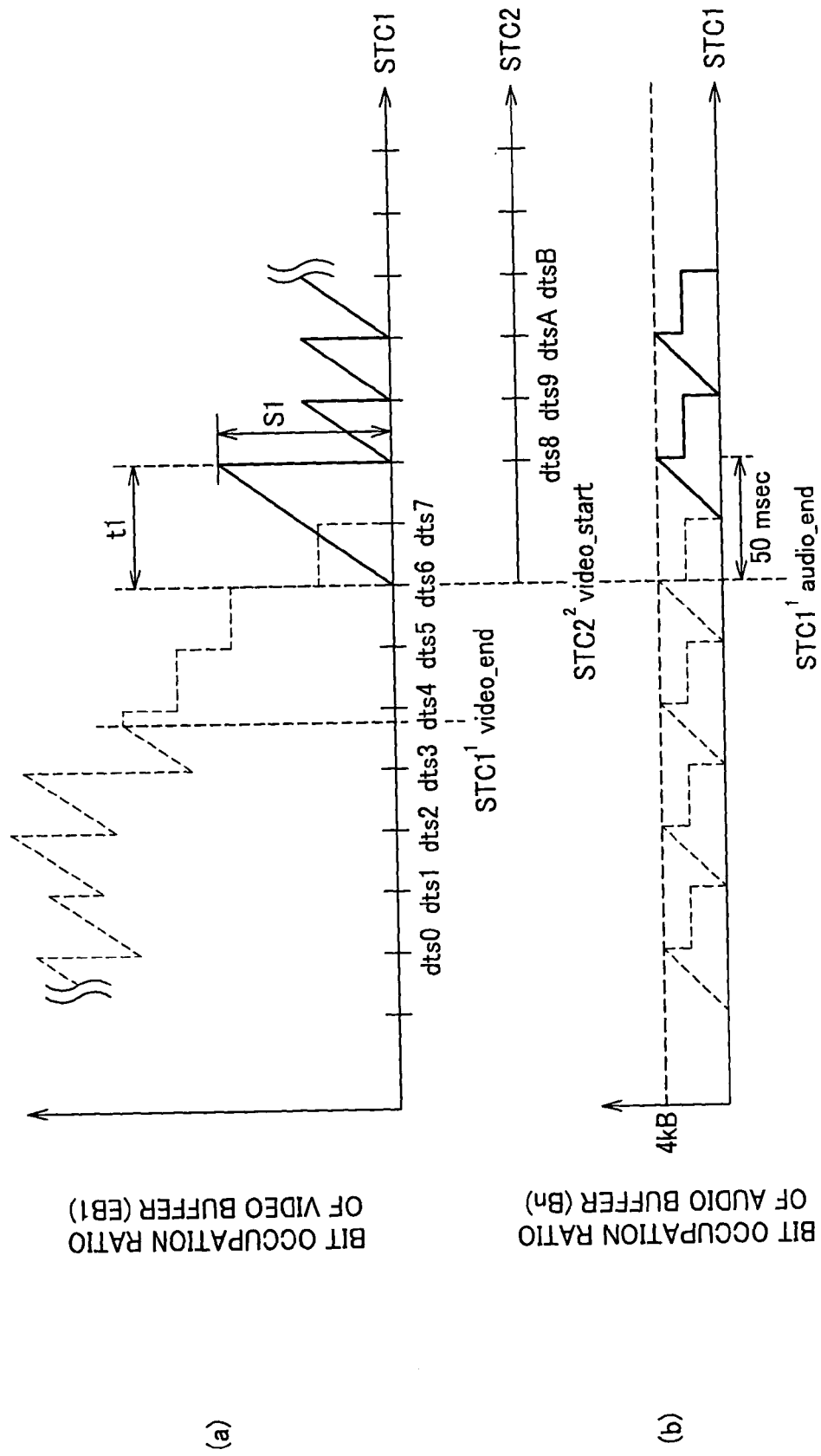
FIGS. 14(a) and 14(b) are graphs showing examples of changes in the bit occupation amount of video buffer and audio buffer of the DVR-STD during the shift between TS1 and TS2 connected seamlessly to TS1 in the case where the size of audio buffer is 4 kbytes, in the conventional DVR-STD.

FIGS. 14(*a*) and 14(*b*) are graphs showing examples of changes in the bit occupation amount of video buffer and audio buffer of the DVR-STD during the shift between TS1 and TS2 connected seamlessly to TS1 in the case of audio buffer having 4 kbytes buffer size in the conventional DVR-STD. In FIGS. 14(*a*) and 14(*b*), the dotted line denotes a buffer transition of video/audio data of TS1, and the solid line denotes a buffer transition of video/audio data of TS2.

The audio buffer of 4 kbytes can store the audio data corresponding to 50 milliseconds. Accordingly, at $STC1^1_{audio\_end}$ which is the time at which the last byte of the last audio packet of TS1 reaches the DVR-STD, it is possible to multiplex TS1 so that the input of the audio data is completed 50 milliseconds earlier than the reproduction timing thereof. However, 50 milliseconds are not enough to input the picture (I picture) to be decoded first in TS2 to the video buffer by the decoding timing thereof. In this case, encoding is so restricted as to lower the size of the picture (I picture) to be decoded first in TS2, which deteriorates the image quality.

Since the audio buffer of 4 kbytes can move ahead audio data by 50 milliseconds, startup delay t1 shown in FIGS. 14(*a*) and 14(*b*), which is the time for inputting the first I picture of TS2 to the video buffer, becomes as small as up to 50 milliseconds. Therefore, it is impossible to take enough time to input the first I picture of TS2, lowering the I picture size S1, with the result that image quality of I picture is deteriorated due to restriction on encoding. As described above, it has been necessary to provide additional buffer corresponding to 1 second in addition to 4 kbytes and to input I picture at the maximum rate RMAX of TS between T1 and T2 in order to increase the start-up delay. Here, description is given of AC3 audio stream having a bit rate of 640 kbps. However, as described above, additional buffer corresponding to 1 second is extremely large for multi-channel LPCM audio.

Figure 15:
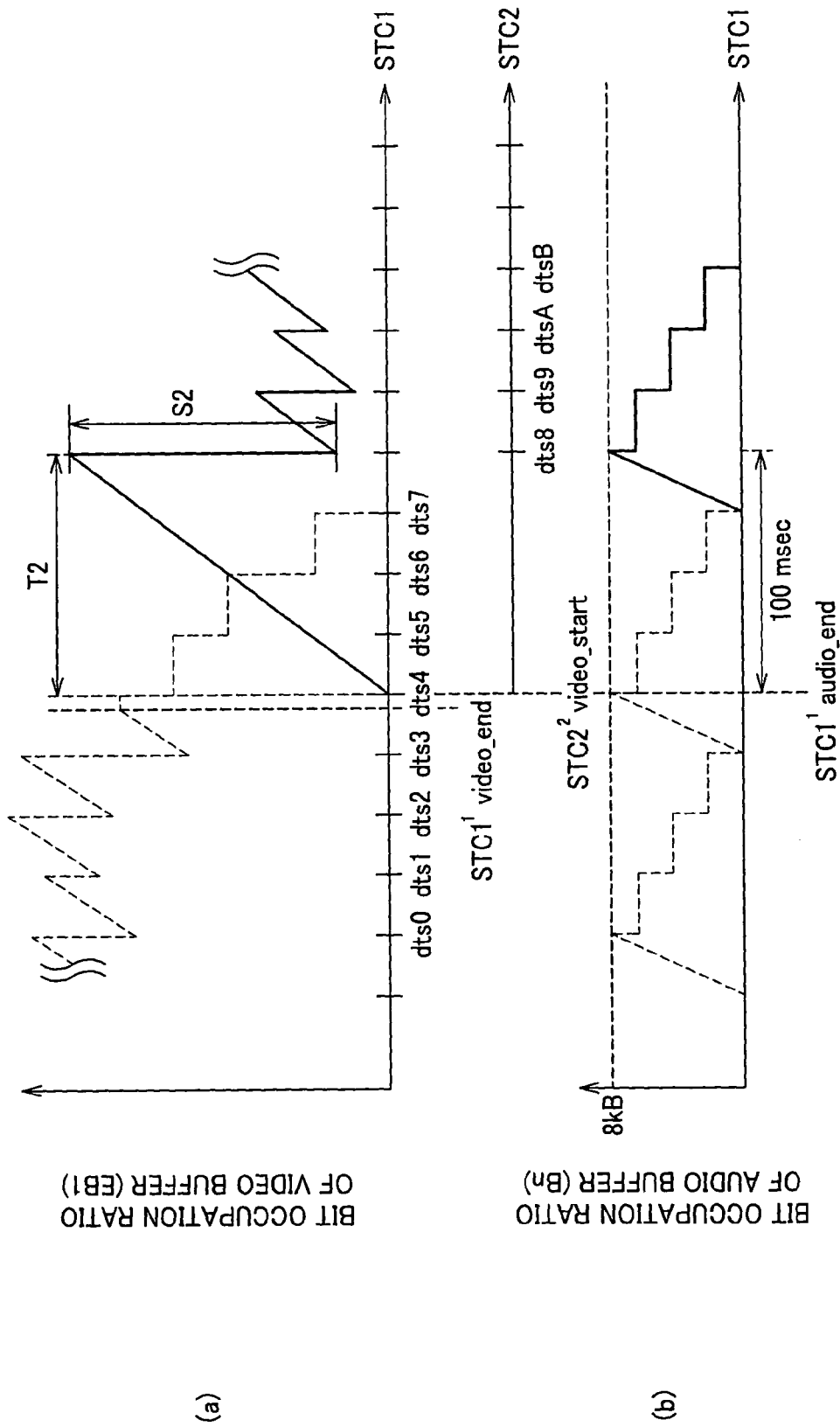
FIGS. 15(a) and 15(b) are views for explaining an advantage in the embodiment of the present invention, and are graphs showing examples of changes in the bit occupation amount of video and audio buffers of the DVR-STD during the shift between TS1 and TS2 that is seamlessly connected to TS1 in the case where the size of audio buffer is 8 kbytes.

To cope with this problem, the audio buffer size of the DVR-STD is changed to, for example, 8 kbytes like the decoder 20 of the present embodiment. FIGS. 15(*a*) and 15(*b*) each shows an example in which the capacity of audio buffer is optimized. More specifically, FIGS. 15(*a*) and 15(*b*) show are graphs showing examples of changes in the bit occupation amount of video and audio buffers of the DVR-STD of the present embodiment during the shift between TS1 and TS2 that is seamlessly connected to TS1 in the case where the size of audio buffer is 8 kbytes. In FIGS. 15(*a*) and 15(*b*), the dotted line shows a buffer transition of video/audio data of TS1, and the solid line denotes a buffer transition of video/audio data of TS2.

The audio buffer of 8 kBytes can store the audio data corresponding to 100 milliseconds. Accordingly, at time $STC1^1$ audio end at which the last byte of the last audio packet of TS1 reaches the DVR-STD, it is possible to multiplex TS1 so that input of the audio data is completed 100 milliseconds earlier than the reproduction timing thereof. With at least 100 milliseconds, the picture (I picture) to be decoded first in TS2 can be easily input to the video buffer by the decode timing thereof. That is, it is possible to take enough time (start-up delay) t2 to input the first I picture in TS2, which can increase size S2 of the picture (I picture) to be decoded first in TS2. Therefore, image quality of I picture can be increased due to lower encoding restriction.

Further, in the player model 1 as shown in FIG. 8, TS, which consists of a data stream constituted by a plurality of source packets each having a transport packet and arrival time stamp and which is read out by a decoder based on the arrival time stamp and decoded, can be regarded as being generated and recorded in a multiplexer (information processing device).

As described with reference to, for example, FIGS. 4 to 6, the multiplexer includes a video encoding section that generates re-encoded Clip 1 (first video encoding stream) to end the presentation with a predetermined picture and Clip 2 (second video encoding stream) which is to be presented immediately after the picture and which is re-encoded for starting presentation, a multiplexing section that multiplexes Clip 1 and audio encoding stream synchronized with Clip 1 to generate TS1 and multiplexes Clip 2 and audio encoding stream synchronized with Clip 2 to generate TS2, and a recording section that records the multiplexed stream consists of TS1 and TS2. In the multiplexing section, TS1 and TS2 are multiplexed such that input of the audio data to the decoder 20 can be completed by the time at which the input of the I picture to the decoder 20 is started, the audio data corresponding to the time for inputting I picture, that is, the second picture to the video buffer of the decoder 20. Note that, as shown in FIG. 5, it is possible to generate Bridge-Clip in the encoding section and multiplex Bridge-Clip together with TS1 and TS2 in the multiplexing section.

Recoded on a recording medium configured to record a multiplexed stream generated by the above multiplexer, is the multiplexed stream consists of TS1 that ends with the first picture and TS2 that starts with the second picture reproduced subsequent to the first picture, in which TS1 and TS2 can be input to the decoder 20 based on their arrival time stamp, and TS1 and TS2 are multiplexed such that input of the audio data to the decoder can be completed by the time at which the input of the second picture, that is, the first picture of TS2 to the decoder 20 is started, the audio data corresponding to the time required for inputting the second picture to the decoder 20.

In the above configured present embodiment, when TS1 and TS2 that are seamlessly connected to each other are reproduced, input of the transport packet is performed according to their arrival time stamp from the time at which the input of the last video packet of TS1 to TB1 of the decoder 20 is completed even to the time at which the remaining packets of TS1 are input to the decoder 20, and the size of the audio buffer is changed from 4 kBytes in the conventional DVR-STD to the size capable of storing data amount of audio data having a length corresponding to the time required for inputting the maximum bit amount of I picture to the video buffer by the decode timing thereof. As a result, it is possible to sufficiently assure the time (start-up delay) required from the time at which the input of the last packet of TS1 has been completed to the time at which the input of I picture, which is the first picture of TS2, is completed by the decode timing thereof. Therefore, image quality of I picture can be increased due to lower encoding restriction.

Further, in the method using additional buffer, as is conventional, when audio data in TS is assumed to be, for example, multichannel LPCM audio data, additional buffer having the extremely large capacity is required. Whereas in the present embodiment, it is possible to eliminate the need of the additional buffer that has been indispensable for the conventional method by changing the capacity of audio buffer as above and by inputting transport packets according to arrival time stamp.

The present invention is not limited to the above embodiment described with reference to the accompanying drawings, and it will be apparent to those skilled in the art that various modifications, substitutions or the one equivalent to them can be made without departing from the claims appended hereto and the spirit and scope of the invention.

INDUSTRIAL APPLICABILITY

According to the present invention described above, it is possible to edit the multiplexed stream consisting of video and audio streams with video frame accuracy and reproduce it in a seamless manner, and to eliminate additional buffer corresponding to 1 second that has been required for inputting the transport packet at the maximum bit rate of TS with arrival_time_stamp of the source packet ignored, lowering the buffer amount required for the decoder more than before. Further, it is possible to change the size of the audio buffer to the size capable of buffering the audio data having a length corresponding to the time required for inputting the second picture to the video buffer, so that image quality of the second picture can be increased due to lower encoding restriction.

The invention claimed is:

1. An information processing device that decodes a multiplexed stream which includes a data stream constituted by a plurality of source packets each having a transport packet and arrival time stamp, and in which a second picture, which is the first picture of a second multiplexed stream, is connected to a first picture, which is the last picture of a first multiplexed stream so as to be reproduced seamlessly, comprising:
    output means for outputting the source packets according to the arrival time stamp of the first multiplexed stream;
    a video buffer for buffering video data included in the source packets;
    an audio buffer for buffering audio data included in the source packets;
    video decoding means for decoding the video data buffered in the video buffer; and
    audio decoding means for decoding the audio data buffered in the audio buffer,
    wherein the audio buffer having a capacity capable of buffering the audio data corresponding to the time required for inputting the second picture to the video buffer, said capacity being less than an additional one second of buffer capacity required to accommodate a maximum bit rate when an arrival time stamp is ignored, and
    the output means continues to output the source packets according to the arrival time stamp of the first multiplexed stream between a time T1 and a time T2, T1 being a time at which a last video packet of the first picture of the first multiplexed stream arrives at the video buffer and T2 being a time at which a last byte is input of remaining packets of the first multiplexed stream, and after time T2 the output stream outputs source packets according to an arrival time stamp of the second multiplexed stream.

2. The information processing device according to claim 1, wherein $EBn\_max=(I\_max/Rv) \times Ra$ is satisfied, where $EBn\_max$ (bits) is a capacity required for the audio buffer; $I\_max$ (bits) is a bit amount of the second picture, $Rv$ (bps) is an input bit rate to the video buffer, and $Ra$ (bps) is a bit rate of audio data.

3. The information processing device according to claim 1, wherein the second picture is an intra-frame encoded image.

4. The information processing device according to claim 1, wherein the audio buffer has a capacity capable of buffering the audio data corresponding to at least 100 milliseconds.

5. The information processing device according to claim 1, wherein the multiplexed stream satisfies $STC2^2_{start} > STC2^1_{end}$, where STC_delta is a time difference between presentation end time of the first picture on the time axis of the first multiplexed stream and presentation start time of the second picture on the time axis of the second multiplexed stream, $STC2^1_{end} (=STC1^1_{end} - STC\_delta)$ is a value obtained by converting $STC1^1_{end}$, which is the value on the time axis of the first multiplexed stream at which the last byte of the last packet of the first multiplexed stream is output from the output means, into the value on the time axis of the second multiplexed stream using the time difference STC_delta, and $STC2^2_{start}$ is the value on the time axis of the second multiplexed stream at which the first byte of the first source packet of the second multiplexed stream is output from the output means.

6. The information processing device according to claim 1, wherein the multiplexed stream satisfies $STC2^2_{start} > STC2^1_{end} + delta1$, where STC_delta is a time difference between presentation end time of the first picture on the time axis of the first multiplexed stream and presentation start time of the second picture on the time axis of the second multiplexed stream, $STC2^1_{end}$ (=$STC1^1_{end}$− STC_delta) is a value obtained by converting $STC1^1_{end}$, which is the value on the time axis of the first multiplexed stream at which the last byte of the last packet of the first multiplexed stream is output from the output means, into the value on the time axis of the second multiplexed stream using the time difference STC_delta, and $STC2^2_{start}$ is the value on the time axis of the second multiplexed stream at which the first byte of the first source packet of the second multiplexed stream is output from the output means, wherein after a lapse of a predetermined time delta1 after the last source packet of the first multiplexed stream has been output from the output means, the first source packet of the second multiplexed stream is output from the output means.

7. The information processing device according to claim 1, wherein
assuming that STC_delta is a time difference between presentation end time of the first picture on the time axis of the first multiplexed stream and presentation start time of the second picture on the time axis of the second multiplexed stream, and after a lapse of a predetermined time ATC_delta after the output of the last source packet of the first multiplexed stream has been started, the first source packet of the second multiplexed stream is output from the output means,
the predetermined time ATC_delta is so determined as to satisfy the time difference STC_delta, and the multiplexed stream is so formed as to satisfy the time difference STC_delta.

8. The information processing device according to claim 7, wherein the predetermined time ATC_delta is managed as attachment information of the first multiplexed stream.

9. The information processing device according to claim 1, wherein audio data included in the first and second multiplexed stream is multi-channel audio data.

10. An information processing method that decodes a multiplexed stream which includes a data stream constituted by a plurality of source packets each having a transport packet and arrival time stamp, and in which a second picture, which is the first picture of a second multiplexed stream, is connected to a first picture, which is the last picture of a first multiplexed stream so as to be reproduced seamlessly, comprising:
a step of outputting the source packets according to the arrival time stamp of the first multiplexed stream;
a step of buffering video and audio data included in the source packets in video and audio buffers, respectively; and
a step of decoding the video and audio data buffered in the video and audio buffers, wherein
in the buffering step, the audio data corresponding to the time required for inputting the second picture to the video buffer is buffered in the audio buffer before the second picture is buffered in the video buffer, an audio buffer capacity being less than a capacity required to accommodate an additional one second of data at a maximum bit rate when an arrival time stamp is ignored, and the outputting step continues to output the source packets according to the arrival time stamp of the first multiplexed stream between a time T1 and a time T2, T1 being a time at which a last video packet of the first picture of the first multiplexed stream arrives at the video buffer and a time T2 being a time at which a last byte is input of remaining packets of the first multiplexed stream, and after time T2 the output stream outputs source packets according to an arrival time stamp of the second multiplexed stream.

11. The information processing method according to claim 10, wherein $EBn\_max=(I\_max/Rv) \times Ra$ is satisfied, where EBn_max (bits) is a capacity required for the audio buffer; I_max (bits) is a bit amount of the second picture, Rv (bps) is an input bit rate to the video buffer, and Ra (bps) is a bit rate of audio data.

12. A non-transitory computer-readable recording medium that records a program allowing a computer to decode a multiplexed stream which includes a data stream constituted by a plurality of source packets each having a transport packet and arrival time stamp, and in which a second picture, which is the first picture of a second multiplexed stream, is connected to a first picture, which is the last picture of a first multiplexed stream so as to be reproduced seamlessly, comprising:
a step of outputting the source packets according to the arrival time stamp of the first multiplexed stream;
a step of buffering video and audio data included in the source packets in video and audio buffers, respectively; and
a step of decoding the video and audio data buffered in the video and audio buffers, wherein
in the buffering step, the audio data corresponding to the time required for inputting the second picture to the video buffer is buffered in the audio buffer before the second picture is buffered in the video buffer, an audio buffer capacity being less than a capacity required to accommodate an additional one second of data at a maximum bit rate when an arrival time stamp is ignored, and
the outputting step continues to output the source packets according to the arrival time stamp of the first multiplexed stream between a time T1 and a time T2, T1 being a time at which a last video packet of the first picture of the first multiplexed stream arrives at the video buffer and T2 being a time at which a last byte is input of remaining packets of the first multiplexed stream, and after time T2 the output stream outputs source packets according to an arrival time stamp of the second multiplexed stream.

13. The recording medium according to claim 12, wherein $EBn\_max=(I\_max/Rv) \times Ra$ is satisfied, where EBn_max (bits) is a capacity required for the audio buffer; I_max (bits) is a bit amount of the second picture, Rv (bps) is an input bit rate to the video buffer, and Ra (bps) is a bit rate of audio data.

14. A non-transitory recording medium that records a multiplexed stream which includes a data stream constituted by a plurality of source packets each having a transport packet and arrival time stamp, wherein
the multiplexed stream is formed such that a second picture, which is the first picture of a second multiplexed stream, is connected to a first picture, which is the last picture of a first multiplexed stream so as to be reproduced seamlessly, the first and second multiplexed stream can be input to a decoder based on their respective arrival time stamps, and the input of the audio data corresponding to the time required for inputting the second picture to the decoder can be completed by the time at which the input of the second picture to the decoder is started, an audio buffer capacity being less than a capacity required to accommodate an additional one second of data at a maximum bit rate when an arrival time stamp is ignored, and said source packets continue to be output according to the arrival time stamp of the first multiplexed stream between a time T1 and a time T2, T1 being a time at which a last video packet of the first picture of the first multiplexed stream arrives at a video buffer and T2 being at which a last byte is input of remaining packets of the first multiplexed stream, and after time T2 the output stream outputs source packets according to an arrival time stamp of the second multiplexed stream.

15. The recording medium according to claim 14, wherein (I_max/Rv)×Ra is satisfied in the audio data corresponding to the time required for inputting the second picture to the decoder, where I_max (bits) is a bit amount of the second picture, Rv (bps) is an input bit rate to a video buffer of the decoder, and Ra (bps) is a bit rate of audio data.

16. The recording medium according to claim 14, wherein the second picture is an intra-frame encoded image.

17. An information processing device that generates a multiplexed stream which includes a data stream constituted by a plurality of source packets each having a transport packet and arrival time stamp, and which is read out and decoded by a decoder based on the arrival time stamp, comprising:

video encoding means for generating a first video encoding stream to end the presentation with a first picture and a second video encoding stream that starts the presentation with a second picture to be presented immediately after the first picture; and multiplexing means for multiplexing the first video encoding stream and an audio encoding stream synchronized with the first video encoding stream to generate a first multiplexed stream, multiplexing the second video encoding stream and an audio encoding stream synchronized with the second video encoding stream to generate a second multiplexed stream, and generating a multiplexed stream in which a second picture, which is the first picture of a second multiplexed stream, is connected to a first picture, which is the last picture of a first multiplexed stream so as to be reproduced seamlessly, wherein the multiplexing means multiplexes such that the input of the audio data corresponding to the time required for inputting the second picture to the decoder can be completed by the time at which the input of the second picture to the decoder is started, an audio buffer capacity being less than a capacity required to accommodate an additional one second of data at a maximum bit rate when an arrival time stamp is ignored, and the decoder continues to output the source packets according to the arrival time stamp of the first multiplexed stream between a time T1 and a time T2, T1 being a time at which a last video packet of the first picture of the first multiplexed stream to a video buffer, time T2 being a time at which a last byte is input of remaining packets of the first multiplexed stream, and after time T2 the output stream outputs source packets according to an arrival time stamp of the second multiplexed stream.

18. The information processing device according to claim 17, wherein
(I_max/Rv)×Ra is satisfied in the audio data corresponding to the time required for inputting the second picture to the decoder, where I_max (bits) is a bit amount of the second picture, Rv (bps) is an input bit rate to a video buffer of the decoder, and Ra (bps) is a bit rate of audio data.

19. The information processing device according to claim 17, wherein the second picture is an intra-frame encoded image.

20. An information processing method that generates a multiplexed stream which includes a data stream constituted by a plurality of source packets each having a transport packet and arrival time stamp, and which is read out and decoded by a decoder based on the arrival time stamp, comprising:

a step of generating a first video encoding stream to end the presentation with a first picture and a second video encoding stream that starts the presentation with a second picture to be presented immediately after the first picture; and a step of multiplexing the first video encoding stream and an audio encoding stream synchronized with the first video encoding stream to generate a first multiplexed stream, multiplexed the second video encoding stream and an audio encoding stream synchronized with the second video encoding stream to generate a second multiplexed stream, and generating a multiplexed stream in which a second picture, which is the first picture of a second multiplexed stream, is connected to a first picture, which is the last picture of a first multiplexed stream so as to be reproduced seamlessly, wherein multiplexing is performed in the multiplexing step such that the input of the audio data corresponding to the time required for inputting the second picture to the decoder can be completed by the time at which the input of the second picture to the decoder is started, an audio buffer capacity being less than a capacity required to accommodate an additional one second of data at a maximum bit rate when an arrival time stamp is ignored, and outputting of the source packets according to the arrive time stamp of the first multiplexed stream continues between a time T1 and T2, T1 being a time at which a last video packet of the first picture of the first multiplexed stream arrives at the video buffer and T2 being a time at which a last byte is input of remaining packets of the first multiplexed stream, and after time T2 the output stream outputs source packets according to an arrival time stamp of the second multiplexed stream.

* * * * *